Nov. 29, 1960

H. I. WILEY ET AL 2,962,655

QUALITY CONTROL APPARATUS

Filed Nov. 4, 1955

INVENTORS;
ERLE H. DODGE
MARCELLUS N. GILBERT, JR.
HAROLD I. WILEY

BY

ATTORNEY

INVENTORS:
ERLE H. DODGE
MARCELLUS N. GILBERT, JR.
HAROLD I. WILEY
BY Lawrence Brown,
ATTORNEY Nov. 29, 1960 H. I. WILEY ET AL 2,962,655
QUALITY CONTROL APPARATUS
Filed Nov. 4, 1955 8 Sheets-Sheet 3

INVENTORS:
ERLE H. DODGE
MARCELLUS N. GILBERT, JR.
HAROLD I. WILEY
BY
ATTORNEY

Nov. 29, 1960    H. I. WILEY ET AL    2,962,655
QUALITY CONTROL APPARATUS
Filed Nov. 4, 1955                    8 Sheets-Sheet 4
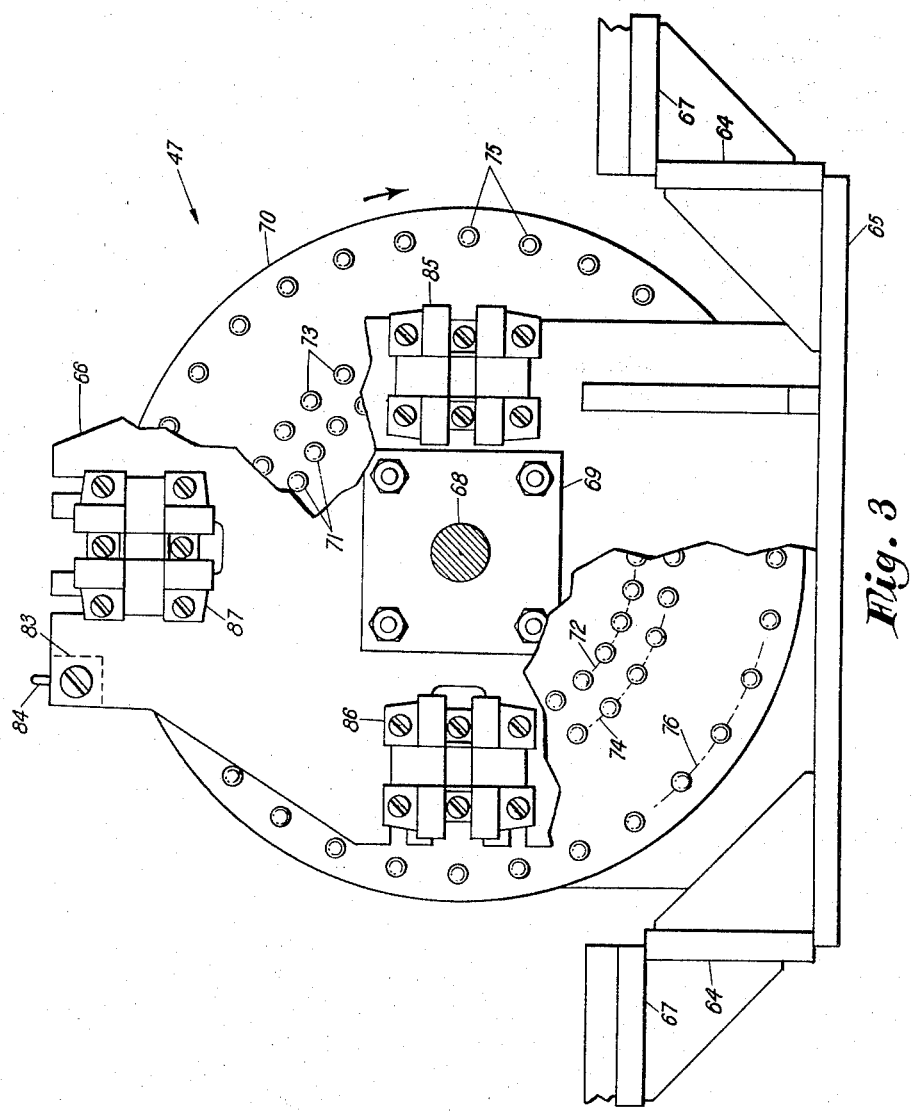
INVENTORS:
ERLE H. DODGE
MARCELLUS N. GILBERT, JR.
BY   HAROLD I. WILEY
ATTORNEY Nov. 29, 1960                H. I. WILEY ET AL                2,962,655
                        QUALITY CONTROL APPARATUS
Filed Nov. 4, 1955                                        8 Sheets-Sheet 5

INVENTORS:
ERLE H. DODGE
MARCELLUS N. GILBERT, JR.
HAROLD I. WILEY
BY

ATTORNEY

Nov. 29, 1960 H. I. WILEY ET AL 2,962,655
QUALITY CONTROL APPARATUS
Filed Nov. 4, 1955 8 Sheets-Sheet 6

INVENTORS:
ERLE H. DODGE
MARCELLUS N. GILBERT, JR.
HAROLD I. WILEY
BY
Lawrence Burns,
ATTORNEY INVENTORS:
ERLE H. DODGE
MARCELLUS N. GILBERT, JR.
HAROLD I. WILEY
BY Lawrence Brown,
ATTORNEY

Fig. 10

United States Patent Office 2,962,655
Patented Nov. 29, 1960

2,962,655

QUALITY CONTROL APPARATUS

Harold I. Wiley, Danvers, Erle H. Dodge, Beverly, and Marcellus N. Gilbert, Jr., Lynnfield, Mass., assignors, by mesne assignments, to Sylvania Electric Products Inc., Wilmington, Del., a corporation of Delaware Filed Nov. 4, 1955, Ser. No. 545,088

17 Claims. (Cl. 324—20)

This invention relates generally to quality control apparatus for electrical manufacturing machinery and particularly to such apparatus for use in the manufacture of electric devices.

The apparatus is especially useful in the manufacture of elongated electric discharge tubes, such as fluorescent lamps, having an electrode at each end thereof.

During such manufacture, the lamps have to be exhausted of air, the electrodes activated, the lamps then filled with an inert gas and mercury vapor, and hermetically sealed. These steps are usually accomplished on a machine having a series of exhaust heads, to each of which a lamp can be attached. The heads carry the lamps through a fixed path, during which they are subjected to a series of exhausting, activating, filling and sealing operations.

An occasional lamp produced on such a machine will be defective, and it is important to detect and segregate such a lamp. The defect may be one present in the structure of the lamp as received by the machine, or it may be one due to defective processing by the machine itself; in either case, it is desirable to know the type of defect, and whether it is confined to lamps made on any particular head or heads on the machine. In the latter case, the head or heads affected can be repaired, if known, or the lamps fed only to the unaffected heads.

One object of the present invention is accordingly to detect defective lamps, and another is to thereafter segregate them from the good lamps. Further objects are to provide an indication of the type of defect in each case, and of the head associated with it.

When the same defect occurs in two successive lamps from a particular head, there is generally some difficulty in the apparatus associated with that head and steps should be taken to correct the condition. Another object of the invention, therefore, is to give warning of such an occurrence. In the embodiment described below, that object is achieved by the lighting of a warning lamp upon the detection of the same defect in two successive lamps from any given heads.

In the same embodiment, the detection of defective lamps is achieved by two photocells which receive light from the electrodes at each end of the lamps, and by another photocell which receives light from the middle portion of the lamp, remote from the electrodes. The photocells receiving light from the electrodes are responsive to the blue light from the mercury discharge and not to the red light from the heated electrode. The actuation of the photocell will thus be a rough indication of the presence of the necessary mercury in the lamp. To insure the production of a proper electrical discharge when mercury is present, the voltage between the ends of the electrode is made sufficient to produce such a discharge around the electrode, that is, it is about 10 volts or more.

The photocell receiving light from the middle of the lamp is responsive to the light emitted from that portion of the lamp. The presence of a lamp which does not light is thus indicated by the failure of this cell to be actuated. Such a defect can be due to lack of gas-filled in the lamp, lack of mercury, or to leakage of air into the lamp. The effect of a defective electrode at this position is eliminated by exciting the lamp with a radio frequency coil near the middle of the lamp, rather than by applying voltage between the two electrodes. Alternatively, the lamp may be excited by placing a sufficiently high voltage between the two cathodes and interpreting the results of the inspection accordingly.

The output of the photocells is fed to a so-called "memory" device, and from there to a printing unit and to a segregating unit. The latter separates the defective lamps from the good ones, and the former prints a tape record of the type of defect and the head in which it occurs. The memory device is also connected to an alarm system, which is actuated when the same defect occurs in two successive lamps from the same head.

The photocells, which can be of the photovoltaic type, are interconnected in such a way that if a cell at only one end of the lamp is actuated, one type of defect is recorded, and if a cell at neither end of the lamp is actuated, a different type of defect is recorded. If the cell at the middle of the lamp is not actuated, a third type of defect will be recorded. For convenience, the letters E, G and T are used, respectively for recording the three types of defects. Each of these types of defect is generally due to a different type of difficulty in the machine.

In order for the photocells at the ends of the lamps to be most effective, they are placed at the machine position at which a voltage is placed across the ends of each, without an appreciable voltage between the electrodes, to avoid a discharge through the entire tube. The cell at the middle of the lamp, however, is placed at a later position where a discharge is produced at the middle portion. The photocells at the ends of the lamps are generally placed in positions close to those at which the so-called "tipping torches," or sealing-off torches, are burning and the photocell at the middle of the lamps is subjected to heat emanating from the hot lamps. The considerable resultant heat tends to reduce the effectiveness of the cells and shorten their life to a small fraction of its normal value. We have found, however, that a water-cooling jacket around the cell can be used without diminishing the sensitivity of the latter, and will enormously prolong the cell life.

Other objects, advantages and features of the invention will be apparent from the following description, taken in connection with the accompanying drawings in which:

Figs. 1A and 1B taken together are a diagrammatic illustration of a quality control apparatus, including a schematic diagram of an electrical circuit which forms a part thereof;

Fig. 3 is a view of the memory unit taken from the line 3—3 of Fig. 2 and showing particulary the input side of the unit;

Fig. 10 is a view in cross-section taken along the line 10—10 of Fig. 6 and showing an indexing mechanism associated with the tape feed roll and a striker mechanism employed to apply pressure for printing.

*General arrangement of the apparatus*

Figure 1A:
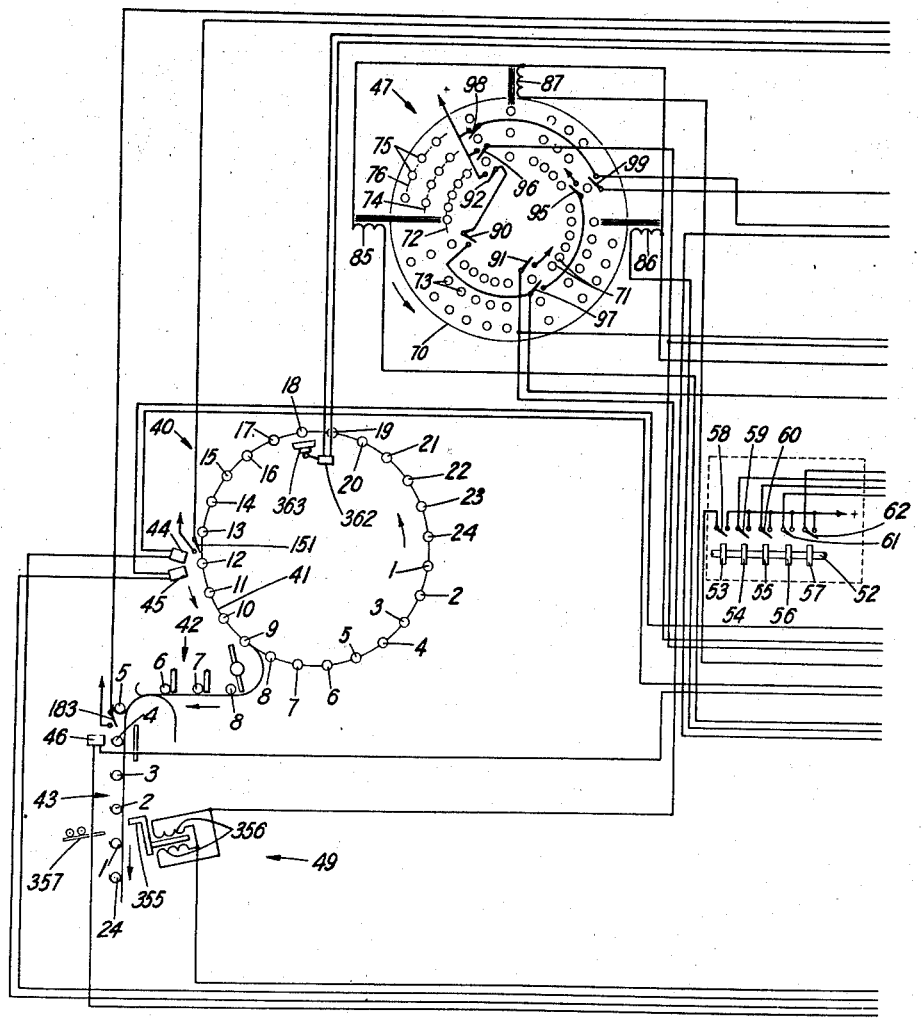
Fig. 1C is an enlarged sectional view of a photocell which shows a water jacket encompassing the photocell.
Figure 1B:
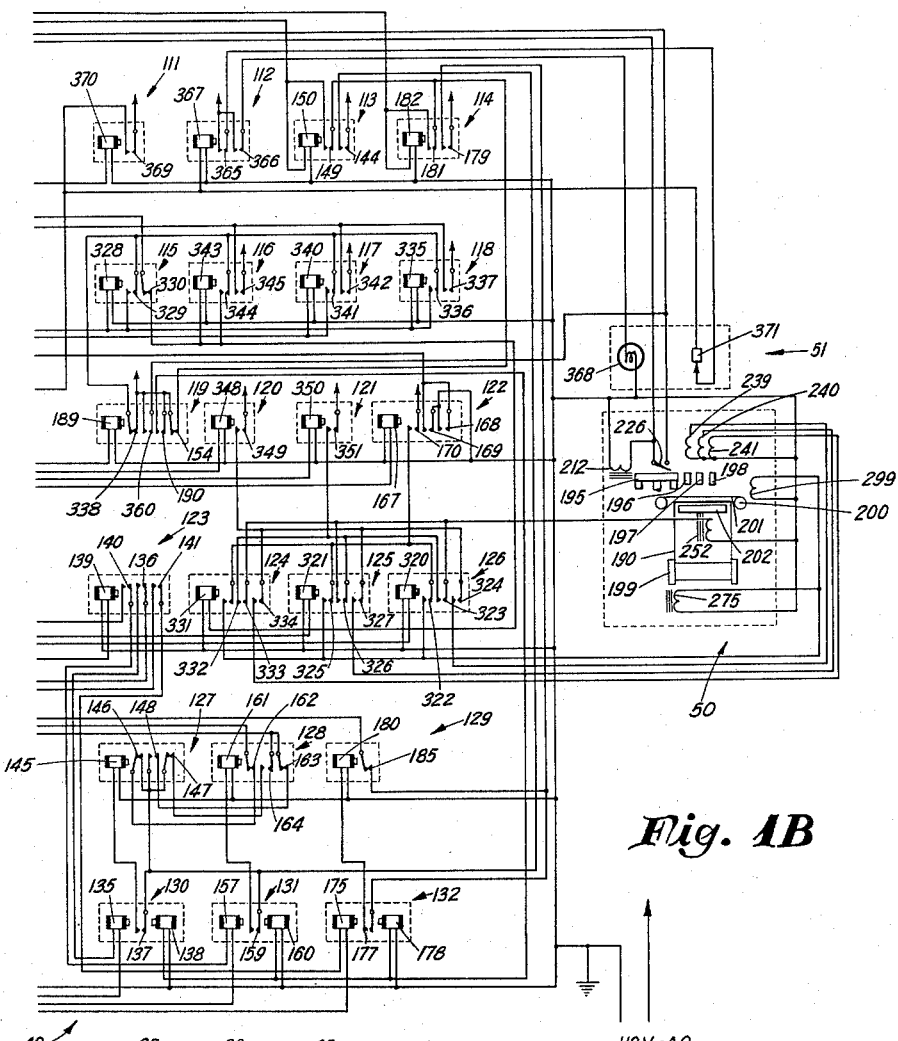

Turning now to the drawings, apparatus according to our invention is shown diagrammatically in Figures 1A and 1B in association with a continuous-motion horizontal exhaust machine indicated at 40. The machine 40 is of a type disclosed in a co-pending patent application Serial No. 343,842 filed March 23, 1953 by Dodge and Kimball, and now Patent No. 2,726,799, and generally comprises a pair of spiders represented schematically as a circle 41. Mounted on each spider is a plurality of fabricating heads numbered for clarity from 1 to 24. Tubular fluorescent lamps are carried on the machine 40, each between a pair of opposed axially aligned heads over a pre-determined path, and thereafter delivered to an unloading conveyor indicated at 42. The lamps are transferred by the conveyor 42 to a vertically-disposed conveyor indicated at 43.

The lamps on the machine 40 are inspected by a pair of photocells 44 and 45 fixedly mounted on suitable frame elements and defining a first inspection station adjacent the paths of the cathodes at the ends of the lamps. Failure of the cathodes of any lamp to emit a pre-determined amount and kind of light to each of the photocells 44 and 45 shows the lamp to be defective.

Each of the photocells is placed to view the cathode region at a position when the cathode is subjected to sufficient voltage to ionize the gas in its vicinity within the lamp. The light from the ionization will be the blue mercury discharge color, so a blue filter is used in front of, or as part of, the photocells to filter out the red radiation from the incandescence of the cathode, since the cathode would be incandescent whether or not ionization occurred. Lack of blue radiation will indicate that there is no mercury in the lamp, or that air has leaked in, or some other defect.

A second inspection station adjacent the vertical conveyor 43 comprises a photocell 46 fixedly supported adjacent a path followed by the central portion of each lamp on the conveyor 43. A defective lamp at the second station is one failing to cast sufficient illumination on the photocell 46.

Figure 1C:
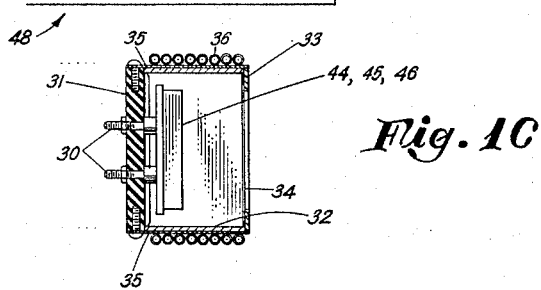

As shown in Fig. 1C, each of the photocells 44, 45, 46 is mounted by its terminal studs 30 on an insulating plate 31 and enclosed within a protective housing or cooling jacket comprising a casing 32, and an open frame 33. The frame 33 retains a blue filter 34 through which light from the lamps reaches the photocell. A pair of strips 35 which serve as a mounting for a coil of tubing 36 are fixed to the frame 33 and to the plate 31 thereby serving to secure component parts of the housing together. Water or a suitable refrigerant is circulated through the coil 36 to carry away heat from the housing.

At the time that defects are detected by the photocells 44, 45 and 46, said defects are recorded temporarily by a so-called "memory disk" unit indicated at 47. To accomplish this temporary recording function the photocells 44, 45 and 46 are connected to the memory unit 47 through a portion of a circuit indicated at 48. Once a particular lamp has been identified as defective in one or more ways, this information is stored in the memory unit 47 and at a later time employed to control the operation of related devices. Thus the memory unit 47 controls the operation of a defective lamp segregating mechanism indicated at 49, a tape recording unit indicated at 50 and an alarm device indicated at 51. Sequencing of the separate operations performed by the apparatus is accomplished by timing cams 53 to 57, inclusive, mounted on a shaft 52. Each of the cams 53 to 57 closes a normally open switch, numbered from 58 to 62, in a pre-determined time sequence.

*The memory unit*

*Mechanical construction.*—The memory unit 47, which will now be described in greater detail, may be seen in Fig. 2. It comprises a fixed framework including a horizontal plate 65 supporting a vertical plate 66 and in turn supported on suitable stationary elements of the machine 40, for example. The plate 65 is fixed to side panels 64 which are provided with flange members 67 suitable for mounting on the machine 40 or other fixed support. The component parts of the framework may advantageously be interconnected with a suitable rib members to provide necessary rigidity. A shaft 68 is journalled for rotation in a bearing block 69 fixed to the vertical plate 66. At its outer end, to the right of the plate 66, the shaft 68 carries a disk 70 fixedly mounted thereon.

Figure 4:
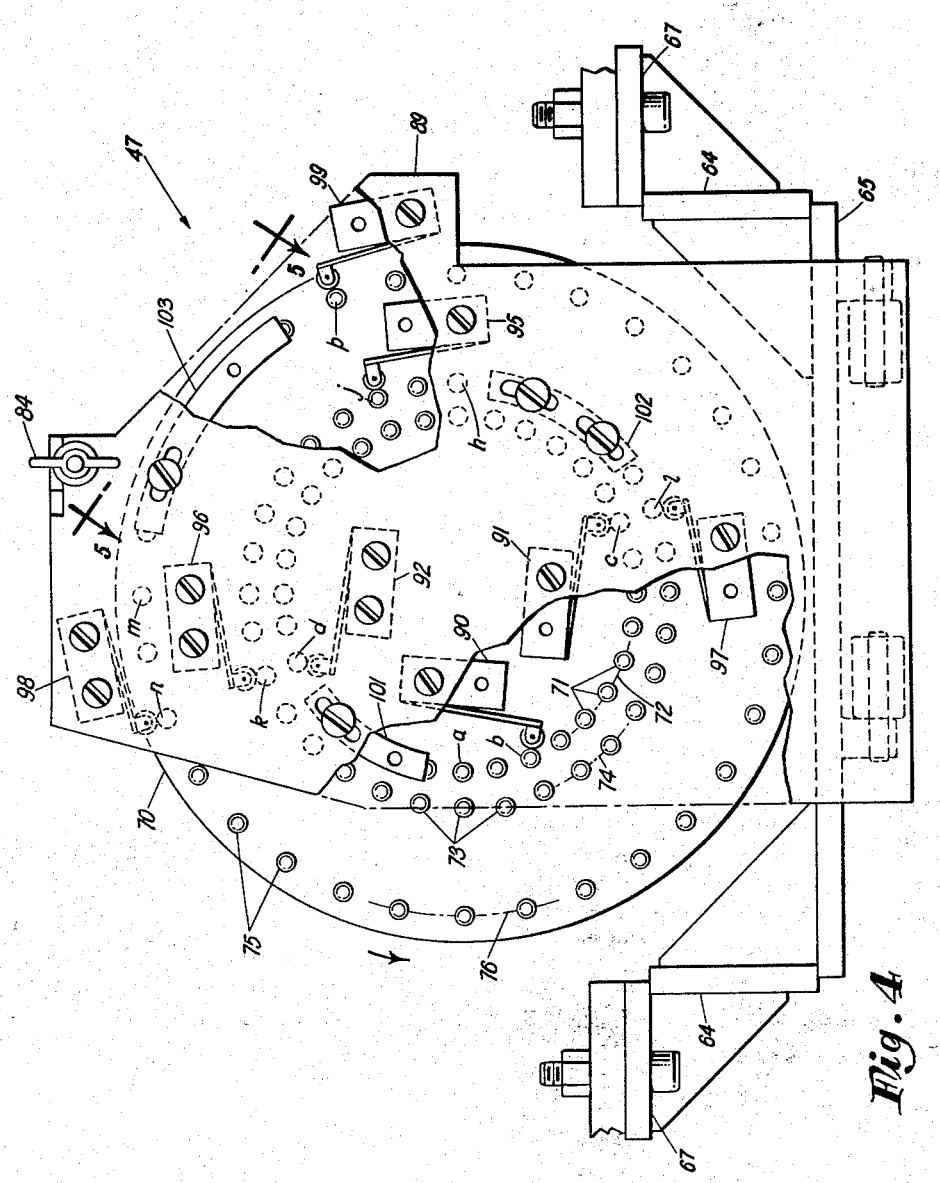
Fig. 4 is a view in end elevation of the memory unit taken from the line 4—4 of Fig. 2 and particularly showing the output side of the unit.

Mounted in concentric circles on the disk 70 are three sets of pins, each pin being slidable transversely through said disk in response to the presence of a defective lamp in a particular head of the exhaust machine, each set being mounted in a circle, as shown in more detail in Fig. 4. One set of pins 71 is disposed in an inner circle 72, a second set of pins 73 is arranged in an intermediate circle 74, and a third set of pins 75 forms an outer circle 76. Each circle consists of thirty-two pins spaced substantially equidistant from one another, each pin of each circle being intersected by a common radial hole 77 with a pin in each of the other two circles. Each pin is slidable axially from an inactive position, to the left, to a switch actuating position, to the right, as shown in Fig. 2. The pins 71, 73 and 75 are retained against axial displacement by friction shoes 78 and 79 disposed within the radial holes 77. Each hole 77 encloses two shoes 78, one urged into frictional engagement with the related pin 73 and the other with the pin 75 by an interposed compression spring 80. A third shoe 79 is biased into contact with the related pin 71 by a spring 81 compressed between the bottom of the hole 77 and the shoe 79.

The shaft 68 is operatively connected to the spider 41 shown in Fig. 1A through any common mechanical coupling, not shown, such as a roller chain and sprockets, to provide rotation of the disk 70 in synchronism with the motion of the spider 41. Thus the disk 70 rotates, through an arc included between adjacent pins of a given circle, during the time interval required for a head on the spider 41 to travel the distance between adjacent heads. Since the ratio of pins in a circle on the disk 70 to the heads on the spider 41 is 32 to 24, the disk 70 makes three revolutions during the time required to complete four revolutions of the spider 41.

Figure 2:
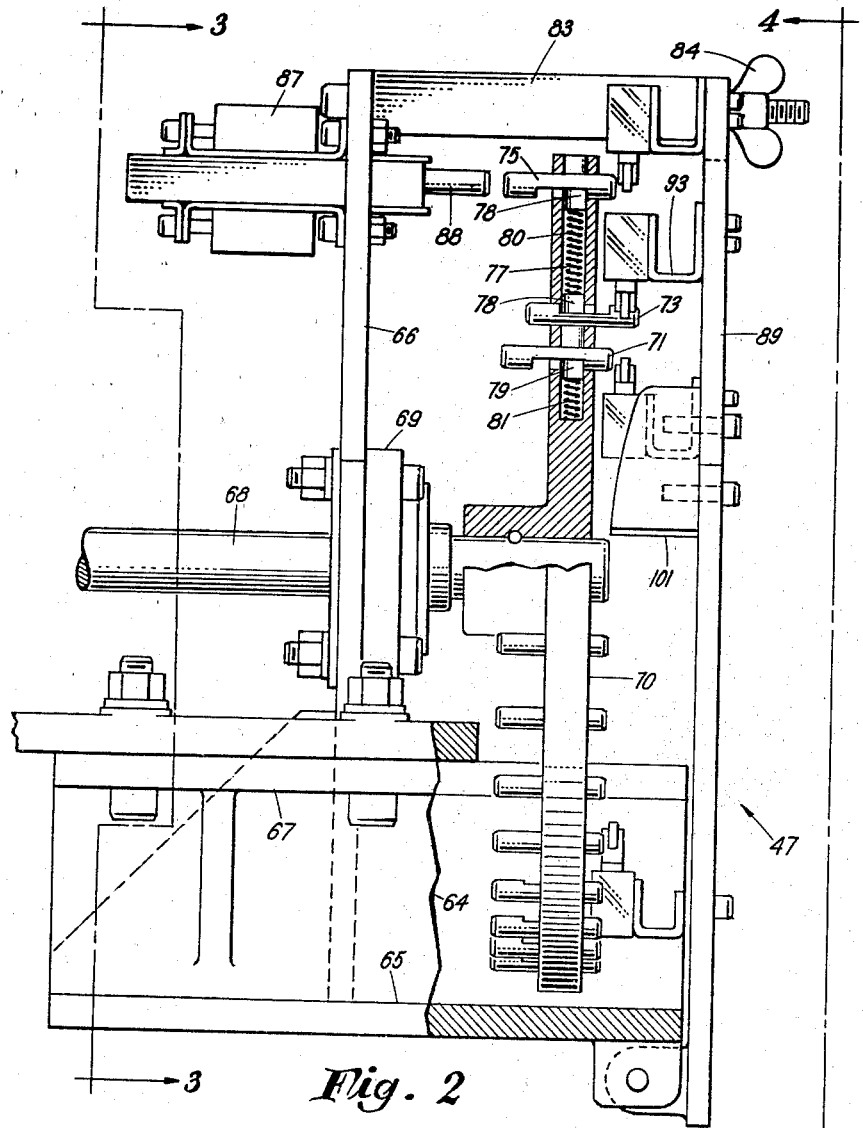
Fig. 2 is a view in side elevation of a so-called "memory unit" which forms a portion of our apparatus.

*Pin actuation.*—Turning now to Figures 2 and 3, solenoids 85, 86 and 87 are fixedly mounted on the plate 66 and associated respectively with the pins 71, 73 and 75. Each of the solenoids 85, 86, 87 is provided with a movable plunger 88 shown more particularly for the solenoid 87 in Fig. 2. The solenoid 87 is positioned on the plate 66 with its plunger 88 at a distance from the axis of rotation of the disk 70 equal to the radius of the circle 76 on which the pins 75 are disposed. Thus when the solenoid 87 is energized, its plunger 88 moves to the right, contacting a pin 75 in the circle 76 and moving said pin to its switch actuating position. The solenoids 86 and 85 are similarly associated with the pins 73 of circle 74 and the pins 71 of circle 72, respectively.

A hingedly mounted plate 89, maintained in position by a latch bar 83, equipped with a wing nut 84 is best shown in Figs. 2 and 4 and will now be more fully described together with its components mounted thereon. The plate 89 supports three sets of switches, each set associated with one of the circles of pins already described. The first set consists of switches 90, 91 and 92 each fixed by means of a bracket 93 to the plate 89 and positioned to be operable by the pins 71 in the circle 72. The second set includes switches 95, 96 and 97 similarly mounted on the plate 89 and operable by the pins 73 of the circle 74. The third set comprises switches 98 and 99 similarly fixed to the plate 89 and operable by the pins 75 arranged in the outer circle 76 on the disk 70.

Figure 5:
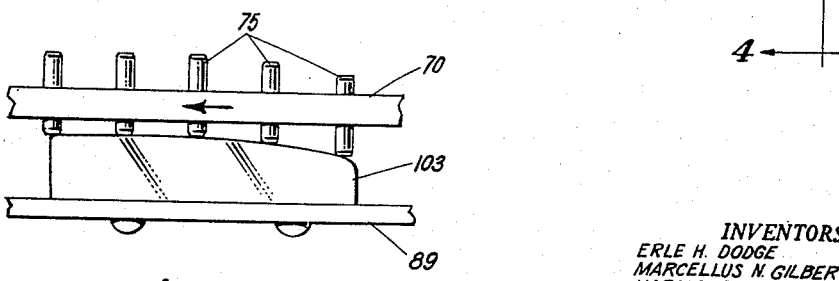
Fig. 5 is a fragmentary view taken along the line 5—5 of Fig. 4 and showing a stationary cam which forms a part of the memory unit.

In addition to the switches already mentioned, the plate 89 also carries arcuate cams 101, 102 and 103 fixed thereto and associated respectively with the pins 71 of circle 72, pins 73 of circle 74 and pins 75 of circle 76. Each of the cams 101, 102, 103 has an operative surface, best seen for cam 103 in Fig. 5, which converges toward the disk 70 in the direction of motion of the disk 70 whereby pins which have been displaced to indicate defects in lamps are returned to their inactive position.

*Types of defects indicated.*—Before proceeding with a detailed description of the portion of the circuit 48 related to the solenoids 85, 86, 87, a brief description will be given of the types of defects with which this embodiment of our invention is concerned. The photocells 44 and 45, shown in Figure 1A at the first inspection station, detect two different types of defects occurring in lamps in process on the machine 40 before the lamps are tipped-off, that is, before the exhaust tubes are sealed. These defects are classified as "G" defects, in which both electrodes fail to ionize, generally, because of failure of vacuum within the lamp and "E" defects, in which only one electrode fails to ionize. At the second inspection station, the photocell 46 detects so-called "T" defects, that is the failure of luminous discharge to occur from one electrode to the other through the tubular envelope of the lamp. This defect generally results from a faulty tipping-off operation, which produces a cracked tip, and lets air into the lamp.

*The electrical circuit.*—The portion of the circuit 48, through which the photocells 44, 45 and 46 are electrically connected to the solenoids 85, 86 and 87 forming an input to the memory unit 47, will now be more particularly described with reference to the Figs. 1A and 1B. For convenience of reference, relays included in the circuit 48 will be indicated at the outset by numbers 111 through 132 starting at the upper left and proceeding from left to right in each lower horizontal row. It should be noted that in the Figs. 1A and 1B all leads indicated as terminating in an arrow represent the ungrounded side of a 110 volt A.C. power line, shown at the lower right hand corner of circuit 48 in Figure 1B.

The photocell 44 forms a closed series circuit with actuating coil 135 of the relay 130 and normally open switch 136 of the relay 123. In this circuit the photocell 44, which is of the photovoltaic type, is capable of generating sufficient current flow through the coil 135 while the switch 136 is closed to effect closure of switch 137. Once the switch 137 is closed, it remains in that position until reset coil 138 is energized as will be explained below. Thus assuming that a normal lamp is present at the first inspection station, sufficient light from the ionized gas near the lamp cathode will pass through the blue filter and fall on the photocell 44 to cause the energizing of the coil 135, if the switch 136 is then closed. Closure of the switch 136 is effected by coil 139 of the relay 123 connected in series across the power source through the cam actuated timing switch 58 which is closed by the cam 53 for a time interval during which each lamp moves through a portion of its path adjacent the inspection station. To regulate the time interval or inspection period during which the photocell 44 is effective, the shaft 52, upon which the cam 53 is mounted, is mechanically connected as through appropriate gearing to make one revolution during the time required for a head on the spider 41 of the exhaust machine 40 to travel the distance between adjacent heads on the spider 41. Therefore, each time that a pair of heads moves past the photocell 44, the switch 58 is closed and the coil 139 is energized closing the switch 136 and switches 140 and 141 whose functions will be described below.

The relay switch 137 is connected in series with normally open switch 144 of the relay 113 and coil 145 of the relay 127 across the power source. This circuit may be traced from the ungrounded terminal of the switch 144, through the switch 144, through the switch 137, then through the coil 145 to the grounded side of the power line. It is therefore seen that when both the switches 137 and 144 are closed, the coil 145 is energized, thereby actuating normally closed switches 146, 147 and normally open switch 148. Closure of the switch 144 and switch 149 of the relay 113 is effected by coil 150 which is connected in series with a switch 151 across the power source.

The switch 151 is normally open and positioned to be operated by physical contact of a lamp moving into the first inspection station where the photocells 44 and 45 are disposed. Assuming that the pair of heads moving into the inspection station carry a lamp, the switch 151 is closed thereby energizing the coil 150 through a circuit which may be traced starting at the ungrounded side of the switch 151, through the switch 151, then through the coil 150 to the grounded side of the power source. The switch 149 which is closed when the coil 150 is energized serves to maintain energization of the coil 150 after the switch 151 opens and until the relay 113 is reset. The circuit for maintaining current flow through the coil 150 after the switch 151 opens includes normally closed switch 154 of the relay 119 and may be traced from the ungrounded side of the switch 154, through the switch 154, through the then closed switch 149, then through the coil 150 to the grounded side of the power source. It should now be clear that coil 150 is energized, closing the switches 144, 149, when a lamp contacts the switch 151 at the first inspection station on the machine 40, and that the coil 150 thereafter remains energized keeping the switches 144, 149 closed until the relay 113 is reset.

Circuitry associated with the photocell 45, which will now be described in detail, includes the relay 131, of the same type as the relay 130 already described in detail as part of the circuit of the photocell 44. Actuating coil 157 of the relay 131 is connected with the photocell 45 in a closed circuit which also includes the normally open switch 140 of the relay 123. The switch 140 is closed at the same time and in the same manner as the switch 136 already described as a pair of heads arrives at the first inspection station and when closed permits a current generated by the photo-cell 45 to energize the coil 157, thereby closing normally open switch 159. The closing of the switch 159 indicates normal illumination falling from the related lamp cathode on the photocell 45 as explained above for the photocell 44. The relay 131 also includes a reset coil 160 whose function will be more fully described later. The switch 159 is an element of a series circuit connected across the power source, which circuit also includes the switch 144 of the relay 113 and coil 161 of the relay 128. Thus when the switch 144 is closed by a lamp contacting the switch 151 at the first inspection station as explained above and the switch 159 is closed by the coil 157 of the relay 131 as a result of the illumination provided to the photocell 45, the coil 161 of the relay 128 is energized through a circuit which may be traced starting from the ungrounded side of the switch 144, of the relay 113 through the switch 144, through the switch 159, of the relay 131 and then through the coil 161 to the grounded side of the power source. Normally closed switches 162 and 163 are opened and normally open switch 164 is closed as the coil 161 is energized.

The relays 127 and 128 control the energizing of the solenoids 85 and 86 which have been described above in relation to the memory unit 47 and which are schematically illustrated in Fig. 1A. Before proceeding further with a description of circuitry associated with the solenoids 85 and 86, it should now be realized that relay 127 will be actuated only when a normal cathode illuminates the photocell 44 and that similarly the relay 128 will be actuated only when its associated photocell 45 is illuminated by a normal cathode.

It will be appreciated that the memory unit solenoids 85, 86 must be actuated after the photocells 44, 45 have inspected the lamp at the inspection station and before relays 130, 131 and 113 are reset for a subsequent operation. This timing is provided by the switch 61 which is closed by the cam 56 on the shaft 52. The switch 61 is closed for a time interval during which appropriate pins 71 and 73 are in registration with plungers 88 of solenoids 85 and 86 respectively. Connected in series with the switch 61 across the power source is coil 167 of the relay 122. During the time interval that the switch 61 is closed, the coil 167 is energized and normally open switches 168, 169 and 170 of the relay 122 are closed. The switches 168 and 169 are connected in parallel with one another in a circuit including memory unit solenoids 85 and 86.

*Operation of the circuit.*—The operation of the circuitry above described during the time interval that the switch 61 is closed will best be understood from a series of brief illustrative examples. If it is first assumed that neither of photocells 44, 45 receives normal illumination from its related cathode, a "G" defect, previously defined, is indicated and neither of the relays 127, 128 is actuated. Under these circumstances the solenoid 85, associated with the inner circle 72 of pins 71 on the memory disk 70, will be energized through a circuit which can be traced from the ungrounded side of the switch 144 of the relay 113, through the switch 144 which is then closed, through the normally closed switch 146 of the relay 127 and the normally closed switch 162 of the relay 128, then through the solenoid 85, and through the then closed switches 168, 169 of the relay 122 to the grounded side of the power line. When neither the relay 127 nor the relay 128 is actuated circuits through the solenoid 86 are interrupted as will be explained below so that only a pin 71 in the circle 72 is pushed to its switch actuating position by the solenoid 85.

If it be now assumed that the photocell 44 is illuminated and the relay 127 thereby actuated while the photocell 45 and the relay 128 remain unactuated, an "E" defect will be indicated. Under these conditions, the solenoid 86 in the memory unit 47 will be energized to displace a pin 73 in the circle 74 on the memory disk 70. The circuit through which the solenoid 86 is energized is traceable starting at the ungrounded side of the switch 144 of the relay 113, through the then closed but normally open switch 144, then through the normally open but now closed switch 148 on the relay 127, through the normally closed switch 163 of the relay 128, then through the solenoid 86, and through the parallel switches 168, 169 of the relay 122 to the grounded side of the power line.

If it be assumed that the photocell 45 is illuminated and the relay 128 thereby actuated while the photocell 44 and the relay 127 remain unactuated an "E" defect will be indicated in a similar manner. The solenoid 86 in the memory unit 47 will again be energized to displace a pin 73 in the circle 74 on the memory disk 70. The circuit through which the solenoid 86 is energized in this second instance is traceable starting at the ungrounded side of the switch 144 of the relay 113, through the then closed but normally open switch 144, then through the normally closed switch 147 of the relay 127, through the normally open but now closed switch 164 of the relay 128, then through the solenoid 86, and through the parallel switches 168, 169 of the relay 122 to the grounded side of the power line.

It will be clear that either the solenoid 85 or the solenoid 86 may be energized at a given time but that both solenoids 85, 86 cannot be simultaneously energized. From the above described circuit for indicating a "G" defect it will be noted that a single series circuit is interposed from the switch 144 of relay 113 to the solenoid 85: through the normally closed switches 146 and 162, of the relays 127 and 128, connected in series. If therefore either relay 127 or 128 is energized alone indicating an "E" defect, or if both relays 127 and 128 are energized, indicating a good lamp, the series circuit between the switch 144 and the solenoid 85 is interrupted and the solenoid 85 remains unactuated.

On the other hand, from the switch 144 of the relay 113 to the solenoid 86, there are two separate circuits through which the solenoid 86 may be energized:

(1) With the relay 127 energized and the relay 128 de-energized, through the normally open but then closed switch 148 of the relay 127 in series with the normally closed switch 163 of the relay 128;

(2) With the relay 127 de-energized and the relay 128 energized through the normally closed switch 147 of the relay 127 in series with the normally open but then closed switch 164 of the relay 128.

If the lamp being inspected has a "G" defect both relays 127, 128 will be de-energized and of the circuits between the switch 144 and the solenoid 86, the first will be interrupted by the switch 148 which will remain open and the second by the switch 164 which will also remain open. If the lamp being inspected is good, both relays 127, 128 will be energized and of the circuits between the switch 144 and the solenoid 86, the first will be interrupted by the switch 163, which will open, and the second by the opening of the normally closed switch 147.

| Defect | Relay 127 | Relay 128 |
|---|---|---|
| G | De-energized | De-energized. |
| E | do | Energized. |
| E | Energized | De-energized. |
| Good Lamp | do | Energized. |

Thus in the presence of a "G" defect, both relays 127 and 128 will be de-energized, meaning that both cathodes fail to ionize. In the presence of an "E" defect, either relay will operate, but not both, because an "E" defect means that one cathode ionizes and one doesn't. And if the lamp is good, both relays are energized, indicating that both cathodes have ionized properly.

From the above, it will be readily understood that there are three alternative effects in the memory unit 47 resulting from the inspection of a given lamp at the first inspection station:

(1) The solenoid 85 is energized, displacing a pin 71 in the inner circle 72 to indicate a "G" defect; or (2) The solenoid 86 is energized displacing a pin 73 in the intermediate circle 74 to indicate an "E" defect; or (3) Neither solenoid 85 nor solenoid 86 is energized and neither a pin 71 in the circle 72 nor a pin 73 in the circle 74 is displaced, indicating a good lamp.

*Circuit for "T" defect response.*—The photocell 46 at the second inspection station will now be described together with a portion of the circuit 48 associated with the said photocell 46 and with the solenoid 87 in the memory unit 47 for recording temporarily "T" defects occurring in lamps in process. It will be appreciated at the outset that while one lamp is being inspected for "G"

and "E" defects by the photocells 44, 45 at the first inspection station another appropriately positioned lamp is simultaneously being inspected for "T" defects at the second inspection station. It will be further realized that during the time interval reserved for recording temporarily, by the operation of solenoids 85, 86, "G" and "E" defects observed in the lamp at the first inspection station, the solenoid 87 is employed to record "T" defects detected in the other lamp at the second station.

The photocell 46, of the same type as photocells 44, 45, is connected in a closed series circuit including coil 175 of the relay 132 and the normally open switch 141 of the relay 123. The coil 139 simultaneously closes the switches 140, 136 and 141 of the relay 123 for a time interval during which appropriate portions of the lamps are in illuminating relationship with the photocells 44, 45 at the first inspection station and the photocell 46 at the second inspection station. As described above, the energizing of the coil 139 is effected by the closure of the switch 58 by the cam 53. If, during this interval, sufficient illumination falls from the lamp at the second inspection station onto the photocell 46, current flow in the aforementioned closed circuit is adequate to energize the coil 175 thereby closing normally open switch 177. Once the switch 177 is closed, it remains closed until reset coil 178, included as part of the relay 132, is energized.

The switch 177 is connected in a series circuit across the power line, said circuit also including normally open switch 179 of the relay 114 and coil 180 of the relay 129. The switch 179 and switch 181 of the relay 114 are controlled by coil 182 which is energized by switch 183 positioned at the second inspection station and forming a series circuit across the power line with the coil 182. The switch 183 is closed by contact of a lamp entering the second inspection station and when the switch 183 is so closed the coil 182 of the relay 114 is energized. Once the coil 182 is energized the switches 179, 181 are closed and remain closed until reset after the time interval reserved for the operation of the memory unit solenoids 85, 86, 87. A holding circuit for the coil 182 is connected by the closing of the switch 181 and includes the switch 154 of the relay 119. Thus when the lamp detecting switch 183 opens as a result of the continuing motion of the lamp entering the second inspection station the coil 182 of the relay 114 remains energized through the holding circuit, which can be traced from the ungrounded side of the switch 154 of the relay 119, through the switch 154, through the then closed but normally open switch 181 of the relay 114, then through the coil 182 to the grounded side of the power line.

When a good lamp is present at the second inspection station, sufficient current flow through the coil 175 is produced by the photocell 46 to effect closure of the switch 177. When the switch 177 closes, the coil 180 of the relay 129 is energized through a circuit across the power line traceable from the ungrounded side of the switch 179 of the relay 114, through the normally open but then closed switch 179, through the switch 177 of the relay 132, and then through the coil 180 of the relay 129 to the grounded side of the power line. Energization of the coil 180 of the relay 129 opens normally closed switch 185 which is connected in a series circuit through which the memory unit solenoid 87 is energized. It is thus seen that with a bad lamp at the second inspection station the switch 185 remains closed, but that the switch 185 is opened by a good lamp at the said station.

Assuming that a defective lamp, that is, one having a "T" defect, is present at the second inspection station, a circuit across the power line, through which the solenoid 87 at the memory unit 47 is energized, will now be described. The circuit can be traced from the ungrounded side of the switch 179 of the relay 114; through the normally open but then closed switch 179; through the normally closed switch 185 of the relay 129; then through the memory unit solenoid 87; and through the normally open but now closed parallel switches 168, 169 of the relay 122, whose function was explained above in connection with the operation of the memory unit solenoids 85, 86, to the grounded side of the power line. It is readily appreciated that this circuit is interrupted and the solenoid 87 remains unactuated when a good lamp is at the second inspection station and the switch 185 is thereby opened as explained above.

*Resetting.*—After the time internal during which defects are temporarily recorded in the memory unit 47 by the actuation of the solenoids 85, 86, 87, it is necessary that relays 113, 114, 130, 131, 132 be reset for the next inspection operation at each of the first and second inspection stations. This function is performed by the relay 119 and its associated circuitry. The relay 119 is actuated by a coil 189 which forms a series circuit across the power line with the cam operated switch 62. When the cam 57 closes the switch 62 during the latter part of the time interval between the start of one inspection operation and the beginning of the next such operation, the coil 189 is thereby energized. With the coil 189 energized, the normally closed switch 154, described above in connection with holding circuits for the coil 150 of the relay 113 and the coil 182 of the relay 114, is opened and normally open switch 190 is closed. The switch 190 forms a series circuit across the power line with each of the reset coils 138, 160, 178 of the relays 130, 131 and 132 respectively. Thus when the switch 190 is closed the reset coils 138, 160 and 178 are energized and the switches 137, 159 and 177 are thereby returned to their normally open position. It will be remembered that, in each of the series holding circuits for continuing energization of the coils 150 and 182 of the relays 113 and 114 respectively, the normally closed switch 154 of the relay 119 was one of the elements. Each of these holding circuits is therefore interrupted when the switch 154 is opened and the relays 113 and 114 thereby de-energized returning the switches 149, 144, 181 and 179 to their normally open positions.

General arrangement of tape recorder unit

Figures 6, 7:
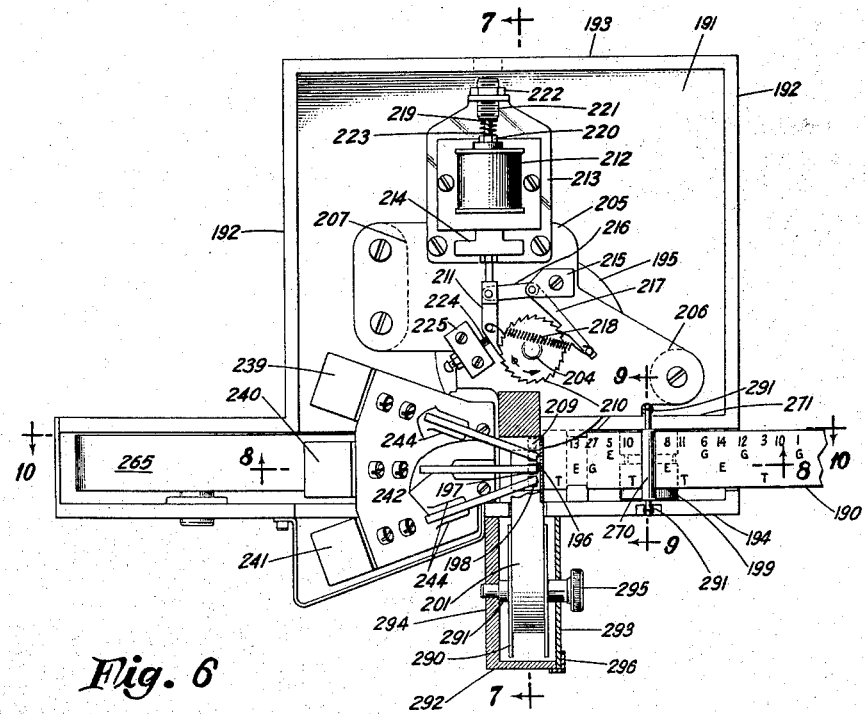
Fig. 6 is a plan view of a recorder unit which forms a part of our apparatus.
Fig. 7 is a view in cross-section taken along the line 7—7 of Fig. 6 and which particularly shows a printing ribbon indexing mechanism, a number disk, and an indexing mechanism for said disk.
Figure 8:
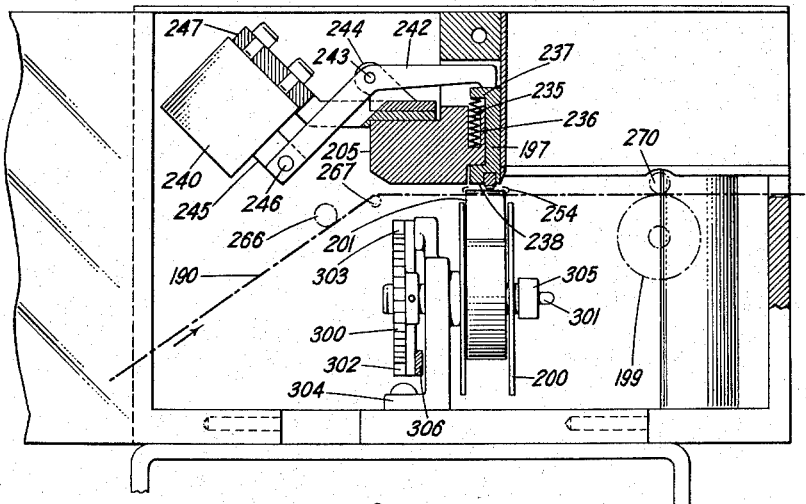
Fig. 8 is a view in cross-section taken along the line 8—8 of Fig. 6, and which shows a stamp employed in the recorder unit to imprint a letter which indicates the presence of a specific type of defect.

With particular reference initially to Figs. 6, 7 and 8, the tape recorder unit 50, which provides a printed record on a paper tape 190 of each lamp rejection, will now be more particularly described. The recorder unit 50 is enclosed within a housing comprising a base plate 191, side wall members 192 and a rear wall member 193. The front of the housing is closed by a hingedly mounted cover 194 which provides access to the unit for adjustments and repairs. The printed record supplied by the recorder 50 includes, for each rejected lamp, the number of the pair of heads on the machine 40 in which the lamp was produced and a letter indicating the type of defect observed in the rejected lamp. In addition to its housing, the recorder unit 50 generally comprises a number disk 195 for furnishing head number information in the printed record; letter stamps 196, 197, 198 for classifying rejected lamps in the record according to types of defects; a paper tape feed mechanism including feed roll 199; a ribbon take-up reel 200, positioned beneath the number disk 195 and illustrated in Fig. 7, for advancing ribbon 201 after each operation of the recorder 50; and a striker 202 shown in Fig. 7 and mounted beneath a portion of the ribbon 201 which overlies the paper tape 190.

*Number disk and indexing mechanism therefor.*—The number disk 195 and an indexing mechanism therefor will now be described with reference to Figs. 6 and 7. The disk 195 is rotatably mounted by its integral shaft 204 in plate 205 supported above the base plate 191 on posts 206 and 207; and bears at its lower margin 208, as seen in Fig. 7, a set of embossed characters, regularly spaced from one another, representing numbers from 1 to 24. The characters are successively indexed to a printing position 209 adjacent the letter stamp 196 in timed relation with the motion of the exhaust machine 40 shown in Fig. 1A. Since, as has already been mentioned and will be more fully explained later, the recorder unit 50 operates when defective lamps are segregated, the character at the printing position 209 at all times corresponds to the number of the pair of heads in which the lamp in position to be segregated by the segregating mechanism 49 (Fig. 1A) has been manufactured. Thus under the conditions illustrated in Fig. 1A in which a lamp from the pair of heads number 2 is shown arriving at the segregating mechanism 49, the character 2 is at the printing position 209.

The disk 195 is indexed, for each successive lamp on the vertical conveyor 43, arriving in position adjacent the segregating mechanism 49, by a mechanism comprising a ratchet wheel 210, fixedly mounted on the shaft 204, a pawl 211 and an actuating solenoid 212. The solenoid 212 is fixed to a bracket 213, mounted on the plate 205 and has a movable plunger 214 to which the pawl 211 is fixedly connected. A block 215 is fixed to the plate 205 and joined to the pawl 211 by a connecting link 216, pivotally connected at each end. In addition to the link 216, the block 215 also carries pivoted thereon a locking pawl 217 provided with a spring 218 held under tension between the pawl 211 and the pawl 217 thereby holding the said pawls in contact with the ratchet wheel 210. The plunger 214 carries at its end opposite the pawl 211 a guide pin 219 threaded therein and retained by a check nut 220. The pin 219 is free to slide in an axial hole in stud 221 which is retained in threaded engagement within the bracket 213 and locked in position by a check nut 222. The plunger 214 is maintained in forward position by a spring 223 encircling the pin 219 and being held under compression between a counterbore in the stud 221 and the nut 220. Rearward motion of the plunger 214 is therefore against the bias of the spring 223 and forward motion of the plunger 214 is limited by contact of the pawl 211 with a limit screw 224 adjustably positioned in block 225 which is fixedly mounted on the plate 205.

The ratchet wheel 210 is indexed through an arc equal to the angular separation between adjacent characters on the number disk 195 each time that the solenoid 212 is energized, as will now be described. When the solenoid 212 is energized the plunger 214 carrying the pawl 211 is retracted against the bias of the spring 223. As the pawl 211 moves rearwardly, the ratchet wheel is prevented from moving in a clockwise direction as seen in Figure 6, by the locking pawl 217. At the end of its rearward travel the pawl 211 engages the next tooth of the ratchet wheel 210. When the solenoid 212 is then de-energized, the pawl 211 moves forwardly, under the bias of the spring 223, thereby advancing the ratchet wheel in a counter clockwise direction through an arc equal to the angular spacing between adjacent teeth, this angular spacing being equal to that between adjacent characters on the number disk 195. The pawl 211 thereafter remains in its forward position until the solenoid 212 is again energized to repeat the indexing operation. To assure correspondence between the characters on the disk 195 at the printing position 209 and the numbers of the heads in which the lamps at the rejection station have been produced, we have provided an additional synchronizing device comprising switch 226, fixed upon a supporting bracket 227 and cooperatively associated with slot 228 in surface 229 at the under side of the disk 195. The synchronizing device will be more particularly described later in conjunction with related circuitry.

*Letter stamp actuating mechanism.*—The number stamps 196, 197, 198 and their related actuating mechanisms will now be described in detail with reference to Figures 6, 7 and 8. Each of the number stamps 196, 197, 198 is slidably mounted in a vertical slot formed in the plate 205 and biased upwardly into inactive position by a compression spring 235 disposed in a hole 236 and bearing against stop lug 237 which limits the downward travel of the stamps 196, 197 and 198. The upward movement of the stamps 196, 197, 198 is limited by a similar lug 238 on each said stamp which contacts the plate 205 when the said stamps are in their inactive position. Movement downwardly is imparted to the stamps 196, 197, 198, bearing on their lower end surfaces embossed characters representing the letters "G," "E" and "T" respectively, by solenoids 239, 240 and 241 respectively. Each stamp is operatively coupled to its related solenoid by a lever 242 best shown in Fig. 8 in which a typical arrangement may be seen for the stamp 197 and the solenoid 240. The lever 242, which is pivoted on a pin 243 mounted in a pair of upstanding ears 244 is pivotally connected at one end to plunger 245 of the solenoid 240 by a pin 246 and at the other end abuts the upper surface of the stamp 197. The ears 244 related to the lever 242 of the stamp 197, are here shown as a separate part fixed upon bracket 247 which is secured to the plate 205 and supports the solenoids 239, 240, 241. The central pair of ears 244 has been thus shown as a separate part to achieve ease of manufacture and uniformity of design of the three levers 242, but may otherwise be made integral with the bracket 247.

When one of the solenoids 239, 240, 241, is energized in response to a defect in a lamp at the segregating mechanism 49 (Fig. 1A) its plunger 245 is pulled inwardly, thereby revolving the related lever 242 slightly in a clockwise direction as seen in Fig. 8 and depressing the related stamp 196, 197, 198 into operative position in the same plane as the embossed character on the disk 195 at the printing position 209. When pressure is thereafter applied to the underside of the paper tape 190 as shown in Fig. 10 by the striker 202 the letter "G," "E" or "T" is imprinted on the tape 190 together with a number supplied by the disk 195 identifying the pair of heads in which the defective lamp was produced.

*Striker actuating mechanism.*—The striker 202, which cooperates with the number wheel 195 and the letter stamps 196, 197, 198 for printing on the tape 190, the record of defective lamps, will now be more particularly described with reference to Figs. 7 and 10. The striker 202 is integral with one end of lever 250 which is operatively coupled at its other end to plunger 251 of solenoid 252. The tape 190 passes over pad 253 cemented to the upper surface of the striker 202 and under a ribbon guide 254 which serves to retain the ribbon 201 in printing position. The ribbon guide 254 is fixedly mounted on the striker 202 and provided with openings in registration with the letter stamps 196, 197, 198 through which contact for printing is established between the ribbon 201 and the tape 190. The solenoid 252 is fixed to the wall member 194 which also supports block 255 carrying pivot pin 256 for the lever 250. The striker 202 is normally retained in inactive position by a spring 257, against a stop pin 258 fixed to the wall 194. The spring 257 is held under tension between the striker 202 and anchor stud 259 threaded into the wall 194 and extending inwardly therefrom. The lever 250 is connected to the plunger 251 by a hinge bolt 260, pivotally mounted on the plunger 251 and extending through a hole 261 adjacent the related end of the lever 250. The bolt 260 is encompassed by a spring 262 and carries a pair of opposed check nuts 263 and a positioner 264 by means of which the plunger 251 is prevented from rotating. The nuts 263 may be adjusted to vary the pressure of the spring 262 upon the lever 250.

Figure 9:
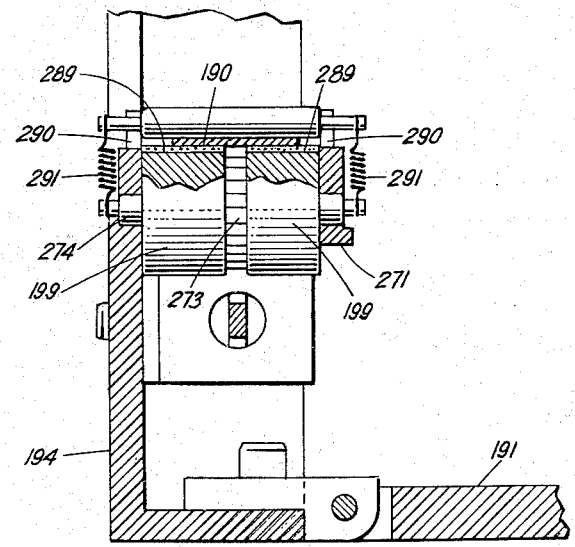
Fig. 9 is a fragmentary view in cross-section taken along the line 9—9 of Fig. 6 and showing rolls employed in the recorder unit to advance a paper tape on which the record is printed.

*Mechanism for advancing paper tape.*—The path of the tape 190 and a mechanism employed in the recorder unit 50 for advancing the tape 190 after a defect has been recorded thereon will now be more particularly described with reference to Figs. 6, 9 and 10. The tape 190 is fed from a roll 265, by frictional contact with the feed roll 199, passing under guide roll 266, over pin 267, through guide 268, between the pad 253 and the ribbon guide 254, through guide 269 and between the feed roll 199 and pressure roll 270. The roll 266 is fixed on the wall 194 while the pin 267 and the guide 269 are suitably affixed between the wall 194 and structural member 271, rigidly connected to the wall 194 by end wall 272. The guide 268 is formed in the upper surface of the block 255, which is also supported between the wall 194 and the member 271 best seen in Figs. 7 and 9. The roll 199 is in two parts, one on each side of a ratchet wheel 273 through which motion is supplied. The ratchet wheel 273 and the roll 199 are fixed on a shaft 274, journalled at one end in the plate 194 and at the other in the member 271. Motion is imparted to the ratchet wheel 273 by a mechanism actuated by solenoid 275 and comprising an actuating pawl 276 connected to plunger 277 by a link 278, and a locking pawl 279, pivotally mounted on block 280. The link 278 is pivoted, at one end, to the plunger 277 of the solenoid 275; and, at the other, to the actuating pawl 276 and to one end of a link 281 which is pivotally connected at its other end to the block 280. The pawls 276 and 279 are maintained in contact with the ratchet wheel 273 by a spring 282 which is held under tension between the two said pawls. The block 280 is secured to the end wall 272 which also carries threaded therein a stop screw 283 equipped with a check nut 284 for adjusting the length of stroke of the plunger 277. The feed roll 199 has a covering 289 of rubber or other suitable material for assuring frictional driving engagement with the tape 190. The roll 270 is retained in slots 290, formed in the wall 194 and the member 271, under pressure at each end from a tension spring 291 connected to the shaft 274 of the roll 199. The link 278 is guided in a slot 285 in block 286 which is fixed to the wall 194 and, when the solenoid 275 is de-energized, the link 278 is biased into abutting relationship with the stop screw 283 by spring 287 retained under tension between the link 278 and the end wall 272.

Figure 10:
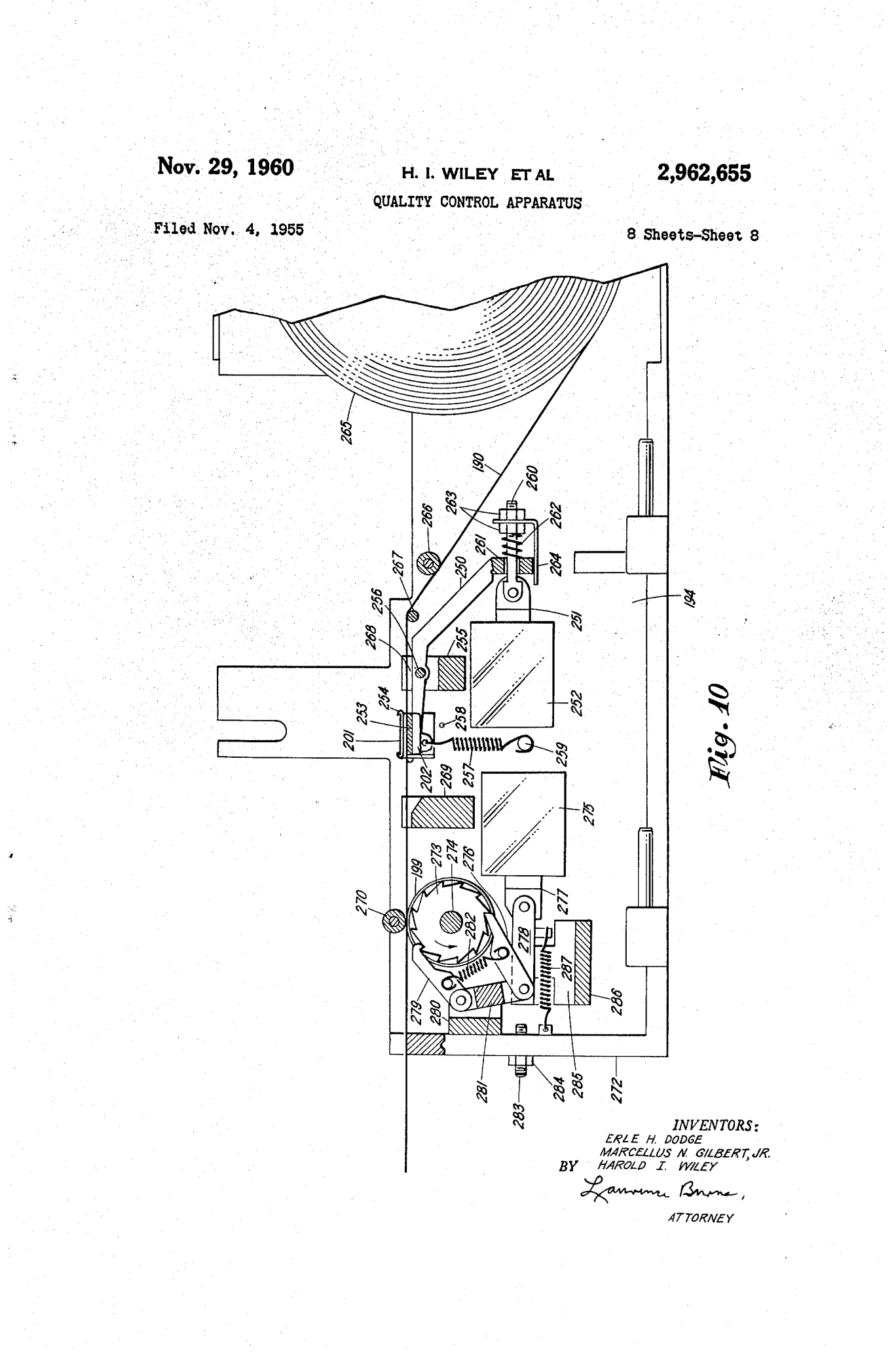

The operation of the feed roll indexing mechanism will now be briefly described with reference to Fig. 10, through a cycle commencing when the solenoid 275, shown energized in Fig. 10, is still de-energized. The link 278 is then in contact with the inner end of the stop screw 283 and the pawl 276 is in engagement with a tooth of the ratchet wheel 273. When the solenoid 275 is energized the plunger 277 is pulled into the solenoid 275 moving the link 278 and the pawl 276 to the position illustrated in Fig. 10, thereby advancing the ratchet wheel 273 in counter clockwise direction through an arc equal to the angular distance between adjacent teeth of the ratchet wheel 273. When the solenoid 275 is thereafter de-energized, the pawl 276 is moved into contact with the next tooth in a clockwise direction under the bias of the spring 287 applied to the link 278. As the pawl 276 moves back, the ratchet wheel 273 is held stationary by the action of the locking pawl 279 in engagement with an appropriate tooth and the mechanism is thereafter ready for a subsequent indexing operation when the solenoid 275 is again energized.

*Mechanism for advancing ribbon.*—The mechanism by which the ribbon 201 is moved after each printing operation will now be described in detail with reference to Figures 6, 7 and 8. The ribbon 201, which is of a type generally used in typewriters, is furnished from a supply reel 290 rotatably mounted on a spindle 291. The supply reel 290 is enclosed within a housing 292 fixed to the wall 194 and having a transparent circular cover 293 through which the tape 201 remaining on the reel 290 may be viewed. The spindle 291 is fixedly mounted in wall 294 of the housing 292 and the reel 290 is retained thereon by knob 295 which is fitted over the spindle 291. The knob 295 is fixed to the cover 293 which is retained on the housing 292 by spring clips 296. From the supply reel 290 the ribbon 201 passes through a suitable opening 297 in the housing 292 and the wall 194; then through the ribbon guide 254 positioned under letter stamps 196, 197, 198; under printing position 209 of the number disk 195; and from there to the take-up reel 200.

For indexing the reel 200 after each printing operation, we employ a mechanism best shown in Fig. 7 and comprising a solenoid 299, fixed to the plate 191; a ratchet wheel 300, fixed to spindle 301, by which the reel 200 is driven; an actuating pawl 302, and a locking pawl 303. The spindle 301 is journalled in upstanding bracket 304 which is fixedly mounted on the plate 191 and the reel 200 is maintained in suitable driving relation on the said spindle 301 by a lock collar 305 best shown in Fig. 8. A link 306 is pivotally connected at one end to plunger 307 of the solenoid 299 and at the other end to a vertical link 308 and to the pawl 302. The vertical link 308 is pivoted on a pin 309 fixed in the bracket 304, the locking pawl 303 also being pivotally mounted on the pin 309. A stop screw 310 threaded in block 311 and locked by a check nut 312 is provided for adjusting the indexing motion of the pawl 302. The block 311 is fixed to the plate 191 and also serves to anchor a spring 313 connected under tension to the link 306 and urging the link 306 into contact with the screw 310. The pawls 302 and 303 are maintained in engagement with the ratchet wheel 300 by a spring 314 mounted under tension between the said pawls.

An operating cycle of the take up mechanism for the ribbon 201 will now be described with reference to Figure 7 in which the actuating solenoid 299 is shown de-energized. The solenoid 299 is energized at the same time as the solenoid 275 shown in Figure 10 and described above in relation with the mechanism for feeding the tape 190. When the solenoid 299 is energized, the plunger 307 is withdrawn into the solenoid 299, moving the link 306 from right to left and thereby indexing a tooth on the ratchet wheel 300 engaged by the pawl 302 through an arc in a clockwise direction equal to the angular spacing between adjacent teeth on the ratchet wheel 300. Thereafter, when the solenoid 299 is de-energized, the link 306 moves from left to right, contacting the screw 310 at the end of its return stroke under the bias provided by the spring 313. The ratchet wheel 300 is prevented from moving in a counterclockwise direction during the return stroke of the link 306 and the pawl 302 by the action of the locking pawl 303 held in engagement with an appropriately positioned tooth of the ratchet wheel 300 by the spring 314. At the end of the return stroke, the pawl 302 engages the next tooth in a counter clockwise direction on the ratchet wheel 300 and is thereafter ready for another indexing operation, the next time the solenoid 299 is energized.

*Operation of recorder unit.*—Before describing the portion of the circuit 48, shown in Figure 1B, which is associated with the operation of the recorder unit 50, an operating cycle of the recorder unit 50 will be described briefly with reference to Figs. 1A, 6 and 7. The solenoid 212 is energized to index the number disk 195 each time a lamp on the conveyor 43 moves into the segregation station adjacent the segregating mechanism 49. At any given time the character on the number disk 195 at the printing position 209 corresponds to the number of the heads in which the lamp at the segregation station has been carried on the exhaust machine 40. In the event that the lamp at the segregation station is defective one of the solenoids 239, 240, 241, depending on the type of defect found in the lamp, is energized and its related stamp 196, 197, 198 thereby depressed into printing position. Thereafter the solenoid 252, shown in Figure 10, is energized bringing the striker 202 into position to apply pressure to the underside of the tape 190. By this pressure, the number of the heads from which the defective lamp originated is printed on the tape 190 by the character on the number wheel 195 at the printing position 209 and a letter "G," "E" or "T" is imprinted by one of the stamps 196, 197, 198 identifying the type of defect. After a time interval during which printing pressure is applied, the solenoid 252 is de-energized and thereafter the letter stamp 196, 197 or 198 is returned to its inactive position as the related solenoid 239, 240 or 241 is de-energized. Then the solenoids 275 (Fig. 10) and 299 (Fig. 7) are energized for advancing the paper tape 190 and the ribbon 201 respectively. It is to be appreciated that the operation of the solenoids 212, 252, 275, 299 and of one of the solenoids 239, 240, 241 occurs during the time interval required for a lamp on the conveyor 43 to travel the distance between adjacent lamps. It is to be further realized that in the event of a succession of good lamps arriving at the segregation station, only the solenoid 212 is energized for indexing the number disk 195 for each lamp.

*Temporary recording by memory unit.*—Before proceeding with a description of circuitry associated with the solenoids 212, 239, 240, 241, 252, 299 and 275 in the operation of the recorder unit 50, the temporary recording function of the memory unit 47 will first be described with particular reference to Figs. 1A and 4. At the time that a lamp is inspected at the first inspection station in the position occupied in Fig. 1A by heads 12, a "G" defect occurring in the lamp is temporarily retained by pushing a pin 71, occupying position "a" in the circle 72, to its switch actuating position. If on the other hand an "E" defect is present in the lamp, the information is recorded by displacement of a pin 73 in the circle 74 occupying position "h." The positions "a" and "h" are in registration with the plungers 88 (Fig. 2) of solenoids 85 and 86 respectively. During the time interval required for a lamp to travel from the first inspection station to the position in which lamp 2 is shown on the conveyor 43 in Fig. 1A, the pins shown at positions "a" and "h" are carried by the disk 70, which rotates in synchronism with the spider 41, to positions "c" and "k" respectively. In travelling from the first inspection station to the position occupied by lamp 2 on the conveyor 43, the lamp passes through the second inspection station in which lamp 4 is shown in Fig. 1A. At the time that the lamp is inspected for a "T" defect at the second inspection station, a "T" defect occurring in the lamp is recorded temporarily by the displacement of a pin 75 in the circle 76 shown at position "m" in Figure 4. As the lamp moves from the second inspection station to the position occupied by lamp 2 on the conveyor 43, the pin carrying it "T" defect information moves from the position "m" to the position "n."

It will now be clear that at a given time the pin in position "n" represents the presence or absence of a "T" defect in the lamp at the position occupied by lamp 2 and that the presence or absence of a "T" defect was recorded when the said lamp was at the second inspection station and the pin now in position "n" was in position "m." It will be similarly understood: that a pin in position "k" is related to the presence or absence of an "E" defect in the same lamp; that a pin in position "c" relates to the presence or absence of a "G" defect also in the same lamp; and that the presence or absence of the said "E" and "G" defects in the said lamp were recorded when the lamp was at the first inspection station and the pins shown at positions "k" and "c" were at positions "h" and "a" respectively. The pins in positions "c" "k" and "n" will hereinafter be referred to, for purposes of simplicity, as pin c, pin k, and pin n respectively.

*Output circuits of memory unit.*—The switches 91, 96 and 98 are normally open. The switch 91 is closed by the pin c if the pin c has previously been displaced to its switch actuating position, indicating the presence of a "G" defect in the lamp now at the position occupied by lamp 2 on the conveyor 43. The switch 96 is similarly closed by the pin k if an "E" defect has been detected in the said lamp and the switch 98 by the pin n if a "T" defect is present in the said lamp.

The portion of the circuit 48 related to the switches 91, 96, 98 and the operation of the recorder unit 50 will now be more particularly described with reference to Figs. 1A and 1B. The switch 91, which is closed when a lamp in the position of lamp 2 has a "G" defect, is connected in series with coil 320 of the relay 126 across the power line and the switch 96 is similarly connected in series with coil 321 of the relay 125. When the switch 91 is closed, the coil 320 is energized and normally open switches 322, 323, 324 thereby closed. On the other hand when the switch 96 is closed, the coil 321 is energized and normally open switches 325, 326, 327 of the relay 125 are then closed.

It will be appreciated that when a "G" defect has been detected in a lamp indicating the presence of air within the lamp before tipping off the exhaust tube, a "T" defect in all probability will be later found in the lamp, indicating the inclusion of air within the lamp after tipping off. Since it is preferable to record such lamps as having a "G" defect only, provision is made to disable the so-called "T" defect channel when a "G" defect occurs in the lamp. The switch 91 is so positioned with respect to pin c that it is closed before the switch 98 is closed by pin n in the event that both pin c and pin n are in switch actuating position. Coil 328 of the relay 115 which controls normally open switch 329 and normally closed switch 330 is connected in series with the switch 91 across the power line. When the switch 91 closes, the coil 328 is therefore energized and the switch 330 opened. The switch 330 is connected in series circuit disposed across the power line and including the switch 98 and coil 331 of the relay 124. When the switch 96 closes, the switch 91 having remained open indicating no "G" defect, the coil 328 of the relay 115 is not energized and the coil 331 of the relay 124 is energized through a circuit across the power line, which circuit can be traced starting at the ungrounded side of the switch 98, through the then closed switch 98, through the normally closed switch 330 of the relay 115, and through the coil 331 of the relay 124 to the grounded side of the power line. Normally open switches 332, 333, 334 are closed by the energization of the coil 331. If the switch 91 is first closed as a result of the presence of a "G" defect the coil 328 of the relay 115 is thereby energized opening the switch 330 through which the coil 331 is otherwise energized. It should now be clear that at a given time the relay 126 may be energized by the closure of the switch 91 or that the relay 124 may be energized by the closure of the switch 98 but that the relay 124 cannot be energized if the relay 115 is first energized by prior closure of the switch 91.

*Holding circuits.*—It is necessary that the relays 124, 125, 126 once energized remain energized during the operation of the recorder unit 50 after the related switch 91, 96, 98 have opened as the pins c, k, n, continue in motion. Therefore, at the same time that the coil 328 of the relay 115 and the coil 320 of the relay 126 are energized through closure of the switch 91, coil 335 of the relay 118 is also energized and switches 336 and 337 of the relay 118 are thereby closed. When the switch 336 closes, the coil 320 is provided with a holding circuit including normally closed switch 338 of the relay 119. The holding circuit for the coil 320 can be traced starting at the ungrounded side of the switch 338, through the normally closed switch 338, through the normally open but then closed switch 336 of the relay 118, and then through the coil 320 of the relay 126 to the grounded side of the power line. The coil 335 of the relay 118 is connected in parallel with the coil 320. It should now be clear that after closure of the switch 91, the coils 335 and 320 will remain energized until the switch 338 of the relay 119 is opened by the energization of its coil 189.

A similar holding circuit is provided for the coil 321 when it is energized by closure of the switch 96 in the memory unit 47. When the switch 96 closes, coil 340 of the relay 117, which forms a series circuit across the power line with the switch 96 is thereby energized and normally open relay switches 341 and 342 are thus closed. The switch 341 is connected in a holding circuit for the coil 321, which circuit also includes the switch 338 of the relay 119 and can be traced starting at the ungrounded side of the switch 338, through the switch 338, through the normally open but then closed switch 341 of the relay 117 and then through the coil 321 of the relay 125 to the grounded side of the power line. The coil 340 of the relay 117 is in parallel with the coil 321 in the above circuit and therefore the coils 321 and 340 remain energized after closure of the switch 96 until the switch 338 of the relay 119 is opened by the energization of the coil 189.

Another similar holding circuit is provided for the coil 331 and comprises the relay 116 including coil 343 and normally open switches 344 and 345. The coil 343 is energized at the same time as the coil 331 by closure of the switch 98 at the memory unit 47 if the coil 328 of the relay 115 has not already been energized by the prior closure of the switch 91. The circuit across the power line through which the coil 343 is energized, can be traced starting at the ungrounded side of the switch 98 at the memory unit 47, through the normally open but then closed switch 98, through the normally closed switch 330 of the relay 115, and then through the coil 343 of the relay 116 to the grounded side of the power line. When the switch 344 of the relay 116 is closed by the energization of the coil 343 a holding circuit is provided for the coil 331 of the relay 124. The holding circuit across the power line for the coil 331 can be traced starting also at the ungrounded side of the switch 338 of the relay 119, through the normally closed switch 338, through the normally open but then closed switch 344 of the relay 116, and then through the coil 331 of the relay 124 to the grounded side of the power line. The coil 343 of the relay 116 is connected in parallel with the coil 331 and therefore the coils 343 and 331 remain energized after closure of the switch 98 until the switch 338 of the relay 119 is opened by the energization of the coil 189.

In addition to holding circuits already described for the coils 320, 321, 331 (relays 126, 125, 124), a fourth holding circuit is provided for the coil 328 of the relay 115 when the coil 328 is energized by closure of the circuit 91. The holding circuit for the coil 328 can be traced starting also at the ungrounded side of the switch 338 of the relay 119, through the normally closed switch 338, through the normally open but then closed switch 329 of the relay 115, and then through the coil 328 to the grounded side of the power line. From the foregoing circuit it should be clear that after closure of the switch 91, the relay 115 remains energized until the switch 338 of the relay 119 is thereafter opened by the energization of the coil 189.

*Summary of types of defects and status of output circuits of memory unit*

If the operation of the input circuits of the memory unit 47 are reviewed, it will be realized that a lamp at the position of lamp 2 on the conveyor 43 may involve one of five possible defects and combinations of defects and that the switches 91, 96, 98 are thereby affected as follows:

| Defect | Switch 91 | Switch 96 | Switch 98 |
|---|---|---|---|
| "G" | Closed | Open | Open. |
| "E" | Open | Closed | Do. |
| "T" | do | Open | Closed. |
| "G" and "T" | Closed | do | Do. |
| "E" and "T" | Open | Closed | Do. |

In the event that the lamp is good all the switches remain open. It will be remembered that at the time of inspection either a "G" or an "E" defect, but not both, is recorded by the memory unit 47. The combinations "G" and "E" and "G," "E" and "T" are therefore impossible with reference to any lamp. Since there is no causal connection between "E" and "T" defects, the occurrence of both "E" and "T" defects in a given lamp is extremely rare, but if it occurs both an "E" and a "T" will be printed.

It will be found convenient for reference to tabulate the defects, the sensing switches 91, 96, 98 affected and the status of the relays 124, 125, 126, 115, 116, 117 and 118 during the interval elapsing between closure of one or two of the switches 91, 96, 98 and the opening of the switch 338 of the relay 119, as follows:

| Defect | Closed Switches | Relays Energized |
|---|---|---|
| "G" | 91 | 126, 115, 118 |
| "E" | 96 | 125, 117 |
| "T" | 98 | 124, 116 |
| "G" and "T" | 91 and 98 | 126, 115, 118 |

The presence of both "G" and "T" defects in a given lamp has the same effect as that of a "G" defect alone since the prior closing of the switch 91 energizes the relay 115 which prevents energization of the relays 124 and 116 corresponding to an "E" defect.

*Letter stamp actuating circuits.*—The relays 124, 125, 126 determine which of the solenoids 239, 240, 241 will be energized. It will be remembered from the foregoing description of the tape recorder 50 that the solenoid 239 when energized moves the "G" letter stamp 196 into printing position and that the solenoids 240 and 241 similarly move the "E" letter stamp 197 and the "T" letter stamp 198 respectively. The time during which a letter stamp is in printing position is determined by the timing relay 120 having a coil 348 and a normally open switch 349. After the time interval during which one of the relays 124, 125, 126 may first be energized by closure of its associated switch 91, 96, 98, the switch 59 is closed by the cam 54 on the shaft 52. The switch 59 is connected in a series circuit across the power line with the coil 348 of the relay 120 and the coil 348 is therefore energized when the switch 59 is closed. Connected in series with the switch 349 of the relay 120, which is thereby closed, are three separate circuits each including one of the switches 324, 327, 334 of the relays 126, 125, 124 respectively and the related letter stamp solenoid 239, 240, 241. Thus, assuming that the relay 126 is energized indicating a "G" defect, when the switch 349 of the relay 120 is closed, the "G" letter stamp 196 will be moved into printing position as its related solenoid 239 is energized through a circuit across the power line which can be traced starting at the ungrounded side of the switch 349, through the normally open but then closed switch 349, through the normally open but then closed switch 324, and then through the solenoid 239 to the grounded side of the power line. If the relay 125 is energized indicating an "E" defect, then, during the time that the switch 349 of the relay 120 is closed, the "E" letter stamp will be similarly moved into printing position as its related solenoid 240 is energized through a circuit which can be traced from the ungrounded side of the switch 349, through the switch 349, through the switch 327 of the relay 125, and then through the solenoid 240 to the grounded side of the power line. Finally, if the relay 124 is energized indicating a "T" defect, then, during the time that the switch 349 of the relay 120 is closed, the "T" letter stamp will similarly move into printing position as its related solenoid 241 is energized through a circuit which can be traced from the ungrounded side of the switch 349, through the switch 349, through the switch 334 of the relay 124, and then through the solenoid 241 to the grounded side of the line. It will be appreciated that the solenoids 239, 240, 241 are usually energized alternatively since, except for a rare simultaneous occurrence of an "E" and a "T" defect, only one of the relays 124, 125, 126 is energized at any given time.

*Striker actuating circuits.*—The striker 202 is brought into contact with the paper tape 190 during a portion of the time interval that one of the letter stamps 196, 197, 198 is in printing position, the said portion commencing after the letter stamp has been actuated and ending before the stamp is permitted to return to its inactive position. The motion of the striker 202 actuated through its solenoid 252 is timed by the relay 121 having a coil 350 and a normally open switch 351. The coil 350 is energized by closing of the switch 60 which is actuated by the cam 55 on the shaft 52 and connected in a series circuit across the power line with the coil 350. The striker solenoid 252 is energized through a circuit including the switch 351 of the relay 121 and in which the switches 323 of the relay 126, 326 of the relay 125 and 333 of the relay 124 are connected in parallel. Thus during the time that the relay 121 is energized, if one of the relays 124, 125, 126 is also energized, the solenoid 252 is actuated through a circuit which can be traced from the ungrounded side of the switch 351; through the normally open but then closed switch 351; through the one of the switches 333 of the relay 124, 326 of the relay 125, 323 of the relay 126 which is then closed; and then through the solenoid 252 to the grounded side of the line.

After the record of a defective lamp has been printed on the tape 190, the striker 202 is returned to its inactive position as the switch 60 is permitted to open by the cam 55, thereby de-energizing the coil 350 of the relay 121 and opening the switch 351. Thereafter, the one of the solenoids 239, 240, 241 which has been energized and its related letter stamp are permitted to return to their inactive position when the switch 349 of the relay 120 is opened as the cam-actuated switch 59 is allowed to open, thereby disconnecting the coil 348 of the relay 120 from the power line.

*Circuits for actuating tape and ribbon advancing mechanisms*

At the completion of the record printing operation described above, the tape 190 and the ribbon 201 are moved forward as the solenoids 275 and 299, which actuate the tape feed roll 199 and the ribbon take up reel 200 respectively, are energized. The energization of the solenoids 275 and 299 is timed by the relay 122 which also times the actuation of the memory unit solenoids 85, 86, 87. Since the tape 190 and the ribbon 201 are advanced after each printing operation regardless of which type of defect has been recorded, switches 332, 325, 322 of the relays 124, 125, 126 respectively are connected in parallel in the energizing circuit for the solenoids 275 and 299. The energizing circuit also includes the switch 170 of the relay 122 which is controlled by the coil 167, energized when the cam-actuated switch 61 is closed by the cam 56 on the shaft 52. Thus during the time that the relay 122 and one of the relays 124, 125, 126 are energized, the solenoids 275 and 299 are connected to the power line through a circuit which can be traced starting at the ungrounded side of the switch 170 of the relay 122; through the normally open but then closed switch 170; through the normally open switch 332 of the relay 124, 325 of the relay 125 or 322 of the relay 126 which is then closed; and then through the solenoids 275 and 299 in parallel to the grounded side of the power line. The solenoids 275 and 299 are de-energized by the opening of the switch 170 of the relay 122, as the coil 167 is deenergized by the opening of the cam-actuated switch 62, the tape 190 and the ribbon 201 then remaining stationary until after the next printing operation.

*Defective lamp segregating device and actuating circuits therefor*

In order to maintain the proper time sequence in the operation of our apparatus, the defective lamp segregating device 49 and the switches 345, 342, 337 of the relays 116, 117, 118 respectively, through which the segregating device 49 is actuated, will now be described. The segregating device 49 is of a somewhat conventional design comprising a pair of arms 355, each generally pivotally mounted and actuated by a solenoid 356. When the solenoids 356 are energized, the arms 355, which are disposed in spaced apart relation along the length of the lamps on the conveyor 43, are moved forward across the path of a defective lamp on the conveyor 43. As it progresses downwardly, the defective lamp contacts the arms 355, and is thereby displaced from its normal position on the conveyor 43 and compelled to roll on the arms 355 into a fixedly supported tray 357.

When a defective lamp is in the position of lamp 2 on the conveyor 43, the solenoids 356 are energized during a time interval commencing with the closure of one of the switches 91, 96, 98 of the memory unit 47 and continuing until the relay 119 is energized as will be explained below. Since, in this embodiment, defective lamps are segregated without regard to the type of defects occurring in them, switches 345 of the relay 116, 342 of the relay 117, and 337 of the relay 118 form a parallel circuit in series across the power line with the solenoids 356, connected in parallel with one another. Thus the solenoids 356 are energized through a circuit which can be traced starting at the ungrounded side of one of the switches 345, 342 or 337 which is then closed; through the closed switch 345, 342 or 337; and then through the solenoids 356 to the grounded side of the power line.

*Resetting of memory unit output relays.*—From our previous description of the holding circuits through which the relays 115, 116, 117, 118, 124, 125 and 126 remained energized after the switches 91, 96, 98 of the memory unit 47 have opened, it will be clear that the normally closed switch 338 of the relay 119 is a series element of each circuit. When the relay 119 is energized by the closing of the cam-actuated switch 62 as already explained above in connection with input circuits of the memory unit 47, all of the above-mentioned holding circuits then in use are interrupted by the opening of the switch 338. The relay 119 is energized for this purpose by the closure of the cam-actuated switch 62 connected in a series circuit across the power line with the coil 189 of the relay 119. The switch 62 is closed after the printing operation and the advance of the tape 190 and of the ribbon 201 have been completed at the recorder unit 50 and also after the operation of the segregating mechanism 49 to remove the defective lamp from the conveyor 43.

*Circuits for indexing number disk.*—The relay 119 also has a normally open switch 360 which controls the energization of the number disk indexing solenoid 212 of the recorder unit 50. It will be remembered that the number disk 195 is indexed when the solenoid 212 is released after having been energized. Synchronism between the number disk 195 and the machine 40 is provided by employing two alternative circuits through which the solenoid 212 may be energized. The first of these circuits includes the normally open switch 226, shown in Fig. 7, having an actuator roll 361 normally in contact with the surface 229 of the disk 195. While the roll 361 is in contact with the surface 229, the switch 226 is closed, but when the roll 361 enters the slot 228, the switch 226 is allowed to open. The opening of the switch 226 occurs only when the character on the number disk 195 adapted to print a numeral 2 on the tape 190 is at the printing station 209. Therefore, the first circuit is employed to index into the printing position 209 characters corresponding to all figures from 1 to 24 except 3.

The second circuit through which the solenoid 212 may be energized includes a normally open switch 362 shown schematically at the machine 40 in Fig. 1A. The normally open switch 362 is fixed to a suitable stationary element of the machine 40 in position to be closed by a cam 363 carried on the spider 41. The switch 362 remains open for all except approximately 2½° of each revolution of the spider 41. The 2½° of each revolution occurs in appropriate time relation for energizing the solenoid 212 to index the character corresponding to the numeral 3 on the disk 195, into the printing position 209. It will be noted that the switch 362 is connected in parallel with the switch 226.

If it is now assumed that the character for printing the numeral 5, for example, is at the printing position 209, the first circuit through which the solenoid 212 can be energized will now be described. The first circuit, which may be placed in operation only during the time interval that the coil 189 of the relay 119 is energized, can be traced starting at the ungrounded side of the switch 360 of the relay 119, through the normally open but then closed switch 360, through the normally open but then closed switch 226 at the recorder unit 50, and then through the solenoid 212 to the grounded side of the power line.

If it is now assumed that the character for printing the numeral 2 is at the printing position 209 and the switch 226 consequently open, the second circuit through which the solenoid 212 may be energized will now be described. It will be further understood that the solenoid 212 is energized through the second circuit only during a time interval while the relay 119 is energized and the switch 362 is concurrently closed by the cam 363 before the arrival at the segregation station of a lamp from heads 3. The second circuit can then be traced also starting at the ungrounded side of the switch 360 of the relay 119, through the normally open but then closed switch 360, through the normally open but then closed switch 362 at the machine 40, and then through the solenoid 212 to the grounded side of the power line.

From the foregoing description of the two alternative circuits it will be realized that the solenoid 212 can be energized only when the switch 360 of the relay 119 is closed and either the switch 226 or the switch 362 is concurrently closed. Since the switch 226 is open when the character representing the numeral 2 is at the printing position 209 and since the switch 362 is only closed just before a lamp from heads 3 moves into the segregation station, it will be appreciated that as the lamp from heads 3 moves into the segregation station and only then will the character representing the number 3 on the number disk 195 move into the printing position 209. If therefore, it is assumed that the disk 195 leads the spider 41, that is the character representing the number 2 is at the printing position at the time that a lamp from heads 1 is at the segregation station, for example, the disk 195 will not be indexed until just before a lamp from heads 3 enters the segregation station. In the event, on the other hand, that the number disk 195 lags behind the spider 41 as would be the case if, for example, a lamp from heads 4 were at the segregation station at the time that the character on the disk 195 at the printing position 209 corresponded to a number 2, the number disk 195 would remain inactivated for almost a complete revolution of the spider 41 or until just before a lamp from heads 3 entered the segregation station.

*Warning device and associated circuits.*—With particular reference to Figs. 1A, 1B, and 4, the action of the normally open switches 90, 92, 95, 97, 98 and 99 associated with the warning device 51 will now be more particularly described. It will be remembered that a "G" defect occurring in a lamp at the first inspection station is recorded temporarily in the memory unit 47 by displacement to its switch-actuating position of the pin 71 then in the position "a" and that, similarly, an "E" defect in the same lamp is recorded by a like displacement of the pin 73 then in the position "h." It will also be appreciated that during the time interval required for the lamp to travel from the first inspection station to the position occupied in Fig. 1A by the heads 10, the pins which carry the "G" and "E" defect information related to the said lamp move from positions "a" and "h" to positions "b" and "j" respectively. Thus the pins at positions "b" and "j," hereafter to be referred to as pins b and j respectively, relate to the presence or absence of "G" and "E" defects respectively in the lamp then carried by the heads 10. At the same time, the pin 71 in the position "d," which is the 24th pin from the pin b in the direction of rotation, counterclockwise, still retains information of the presence or absence of a "G" defect in the lamp carried by the heads 10 during the previous revolution of the spider 41. Similarly, the pin 73 in the position "l" is related to the presence or absence of an "E" defect in the said prior lamp. Hereafter the pin 71 at the position "d" and the pin 73 at the position "l" will be referred to respectively as the pin d and the pin l.

It should now be realized that if, as shown in Fig. 1A, the lamp carried by heads 10 has a "G" defect and the previous lamp carried by the heads 10 also had a "G" defect, both pin b and pin d are in switch-actuating position and that the switches 90 and 92 are simultaneously closed by the pins b and d respectively. Similarly, if the lamp carried by heads 10 has an "E" defect and the previous lamp carried by the heads 10 also had an "E" defect, both the pins j and l are in switch-actuating position and the switches 95 and 97 are closed simultaneously by the pins j and l respectively.

It has already been seen that closure of the switch 98 by the pin n indicates the presence of a "T" defect in the lamp 2, from the heads 2, as shown in Fig. 1A. The switch 98 is associated with the switch 99 for detecting two successive lamps, from a given head, having "T" defects. If a "T" defect was detected in the previous lamp produced in the heads 2 before the lamp 2 now shown on the conveyor 43, the pin 75 in position "p," hereafter called pin p, is in its switch-actuating position. Therefore, if "T" defects are detected both in the lamp 2 in Fig. 1A, and the previous lamp produced in heads 2, the pins n and p are both in switch-actuating position and the switches 98 and 99 are closed simultaneously by the pins n and p respectively.

With reference to Figs. 1A and 1B, the relays 111 and 112 which are associated with the switches 90, 92, 95, 97, 98, and 99 for controlling the warning device 51 will now be more particularly described. The relay 112 is provided with normally open switches 365, 366 and actuated by a coil 367. When the switch 366 closes, a warning lamp 368, which forms a series circuit with the switch 366 across the power line, is thereby energized. The coil 367 may be energized through each of three circuits across the power line. The first of these circuits includes the switches 90 and 92 which are closed in response to successive lamps from a given head having "G" defects and can be traced starting at the ungrounded side of the switch 92, through the switch 92, through the switch 90 and then through the coil 367 to the grounded side of the power line. The second said circuit includes the switches 95 and 97 which are closed in response to two successive lamps from a given head having "E" defects and can be traced starting at the ungrounded side of the switch 95, through the switch 95, through the switch 97, and then through the coil 367 to the grounded side of the power line. The third circuit includes switch 369 of the relay 111 and the coil 367 in series across the power line. Closure of the switch 369 results from two successive lamps produced by a given head and each having a "T" defect since coil 370 of the relay 111 is energized through a series circuit including the switches 98 and 99, The energizing circuit for the coil 370 can be traced starting at the ungrounded side of the switch 98, through the switch 98, through the switch 99 and then through the coil 370 to the grounded side of the power line.

It is desirable that the warning lamp 368 once energized remain connected to the power source until it is observed by the machine operator. Consequently, a holding circuit for the coil 367 is provided and includes the switch 365 of the relay 112 and normally closed switch 371 at the warning device 51. Therefore, after the pair of switches 90 and 92, or 95 and 97, or 98 and 99, through which the coil 367 is first energized, have been permitted to open by continuing motion of the memory disk 70, energization of the coil 367 is maintained through the holding circuit which can be traced starting at the ungrounded side of the switch 365 of the relay 112, through the normally open but then closed switch 365, through the switch 371 at the warning device 51, and then through the coil 367 to the grounded side of the power line. To reset the coil 367 to its normally de-energized position the switch 371, which may be of a commercial push button type, is momentarily opened by the operator, thereby interrupting the holding circuit.

What we claim is:

1. In combination with a machine for manufacturing electrical devices, said machine having a plurality of carriers each adapted to moving one of said devices through a predetermined path, apparatus for detecting and recording types of defects, said apparatus comprising: inspection means for detecting different types of defects in said devices; means, operatively coupled to said carriers and to said inspection means, for thereafter retaining temporarily information concerning the condition of said devices and identification of their carriers; and a recorder unit, separate from said retaining means and controlled by said retaining means, for making, for each defective device, a record containing a symbol identifying the type of defect occurring in the device and the said carrier on the machine in which said defective device was produced.

2. In combination with a machine for manufacturing electric lamps, said machine having a plurality of carriers each adapted to moving one of said lamps through a predetermined path, apparatus for detecting and recording types of defects, said apparatus comprising: photo-cells in light-receiving relation with said lamps for detecting different types of defects therein; means, operatively coupled to said carriers and to said photo-cells, for thereafter retaining temporarily information concerning the condition of said lamps and identification of their carriers; and a recorder unit, separate from said retaining means and controlled by said retaining means, for making, for each defective lamp, a record containing symbols identifying the type of defect occurring in the lamp and the said carrier in which said defective lamp was produced.

3. In combination with a machine for manufacturing electrical devices, said machine having a plurality of carriers each adapted to moving one of said devices through a predetermined path, apparatus for detecting and recording types of defects, said apparatus comprising: inspection means for detecting different types of defects in said devices; a memory unit, including a moving member synchronized with said carriers and bearing a plurality of displaceable elements operatively coupled to said inspection means, for thereafter retaining temporarily information concerning the condition of said devices and identification of their carriers; and a recorder unit, separate from said memory unit and controlled by said memory unit and synchronized with the motion of said carriers, for making, for each defective device, a record containing symbols identifying the type of defect occurring in the said device and the said carrier in which said defective device was produced.

4. In combination with a machine for manufacturing electric lamps, said machine having a plurality of carriers each adapted to moving one of said lamps through a predetermined path, apparatus for detecting and recording types of defects; said apparatus comprising: photo-cells in light receiving relation with said lamps for detecting different types of defects therein; a memory unit including a moving member synchronized with said carriers and bearing a plurality of displaceable elements operatively coupled to said photo-cells for thereafter retaining temporarily information concerning the condition of said lamps and identification of their carriers; and a recorder unit, separate from said memory unit and controlled by said memory unit and synchronized with the motion of said carriers, for making, for each defective lamp, a record containing symbols identifying the type of defect occurring in the lamp and the said carrier in which said defective lamp was produced.

5. In combination with a machine for manufacturing electrical devices, said machine having a plurality of carriers each adapted to moving a device through a predetermined path, signalling apparatus comprising: inspection means for detecting defects in said devices; means, operatively coupled to said carriers and to said inspection means, for thereafter retaining temporarily information concerning the condition of two successive devices from a given said carrier; and means, controlled by said storing means, for signalling in response to two successive defective devices from the same said carrier.

6. In combination with a machine for manufacturing electric lamps, said machine having a plurality of carriers each adapted to moving a lamp over a predetermined path, signalling apparatus comprising photo-cells in light receiving relation with said lamps for detecting defects therein; means, operatively coupled to said carriers and to said photo-cells, for thereafter retaining temporarily information concerning the condition of two successive lamps from a given said carrier; and means, controlled by said storing means, for signalling in response to two successive defective lamps from the same said carrier.

7. In combination with a machine for manufacturing electrical devices, said machine having a plurality of carriers each adapted to moving a device through a predetermined path, signalling apparatus comprising: inspection means for detecting defects in said devices; a memory unit including a moving member synchronized with said carriers and bearing a plurality of displaceable elements operatively coupled to said inspection means, at least two of said elements, at one time, indicating by their positions the condition of successive devices from a given said carrier; and means, controlled by said memory unit, for signalling in response to two successive defective devices from the same said carrier.

8. In combination with a machine for manufacturing electrical devices, said machine having a plurality of carriers each adapted to moving a device through a predetermined path, signalling apparatus comprising: inspection means for detecting defects in said devices; means, operatively coupled to said carriers and to said inspection means, for thereafter retaining temporarily information concerning the condition of two successive devices from a given said carrier; and a signal controlled by said storing means and actuated in response to two successive defective devices from the same said carrier.

9. In combination with a machine for manufacturing electric lamps, said machine having a plurality of carriers each adapted to moving a lamp through a predetermined path, signalling apparatus comprising: photo-cells in light receiving relation with said lamps for detecting defects therein; a memory unit including a moving member synchronized with said carriers and bearing a plurality of displaceable elements operatively coupled to said photo-cells, at least two of said elements, at one time, indicating by their positions the condition of successive lamps from a given said carrier; and means controlled by said memory unit for signalling in response to two successive defective lamps from the same said carrier.

10. In combination with a machine for manufacturing electric lamps, said machine having a plurality of carriers each adapted to moving a lamp through a predetermined path, signalling apparatus comprising: photocells in light receiving relation with said lamps for detecting defects in said devices; means, operatively coupled to said carriers and to said photo-cells, for thereafter retaining temporarily information concerning the condition of two successive lamps from a given said carrier; and a signal controlled by said storing means and actuated in response to two successive defective lamps from the same said carrier.

11. In combination with a machine for manufacturing electrical devices, said machine having a plurality of carriers each adapted to moving a device through a predetermined path, signalling apparatus comprising: inspection means for detecting defects in said devices; a memory unit including a moving member synchronized with said carriers and bearing a plurality of displaceable elements operatively coupled to said inspection means, at least two of said elements, at one time, indicating, by their positions, the condition of successive devices from a given said carrier; and a signal, controlled by said memory unit and actuated in response to two successive defective devices from the same said carrier.

12. In combination with a machine for manufacturing electric lamps, said machine having a plurality of carriers each adapted to moving a lamp through a predetermined path, signalling apparatus comprising: photocells in light receiving relation with said lamps for detecting defects therein: a memory unit including a moving member synchronized with said carriers and bearing a plurality of displaceable elements operatively coupled to said photo-cells, at least two of said elements, at one time, indicating by their positions the condition of successive lamps from a given said carrier; and a signal controlled by said memory unit and actuated in response to two successive defective lamps from the same said carrier.

13. In combination with a machine for manufacturing elongated electric discharge tubes having a cathode at each end, said machine having a plurality of carriers each adapted to moving a said tube through a predetermined path, apparatus for recording defects, said apparatus comprising: inspection means for detecting defects in said tubes, said inspection means including a photo-cell in light-receiving relation with the cathodes at one end of said tubes; means, operatively coupled to said carriers and to said photo-cell, for thereafter retaining temporarily information concerning the condition of said tubes; and means, controlled by said retaining means, for forming a substantially permanent record of the said defective tubes.

14. In combination with a machine for manufacturing elongated electric discharge tubes having a cathode at each end, said machine having a plurality of carriers each adapted to moving a said tube through a predetermined path, apparatus for recording defects, said apparatus comprising: inspection means for detecting defects in said tubes, said inspection means including a first photo-cell in light receiving relation with the cathodes at one end of said tubes, and a second photo-cell in light-receiving relation with the cathodes at the other end of said tubes; means, operatively coupled to said carriers and to said photo-cells, for thereafter retaining temporarily information concerning the condition of said tubes; and means, controlled by said retaining means, for forming a substantially permanent record of the said defective tubes.

15. In combination with a machine for manufacturing elongated electric discharge tubes having a cathode at each end, said machine having a plurality of carriers each adapted to moving a said tube through a predetermined path, apparatus for recording defects, said apparatus comprising: inspection means for detecting defects in said tubes, said inspection means including a first photo-cell in light receiving relation with the cathodes at one end of said tubes, a second photo-cell in light-receiving relation with the cathodes at the other end of said tubes, and a third photo-cell in light-receiving relation with the middle portion of said tubes; means, operatively coupled to said carriers and to said photo-cells, for thereafter retaining temporarily information concerning the condition of said tubes; and means, controlled by said retaining means, for forming a substantially permanent record of the said defective tubes.

16. In a machine, for manufacturing an electrical device, having a carrier adapted to moving said device through an inspection area, the combination of: inspection means for detecting a defect in said device; means, operatively coupled to said carrier and to said inspection means, for thereafter retaining temporarily information concerning the condition of said device; and a recorder unit including a movable member having mounted thereon a symbol identifiable with said carrier, means for advancing said movable member to bring the symbol mounted thereon to an impression-forming position, a movable stamp, bearing a defect-identifying symbol thereon, disposed adjacent to said movable member, means responsive to the detection of a defect for advancing said stamp to bring the defect-identifying symbol thereon to an impression-forming position, and means, responsive to the detection of said defect, for advancing said paper into engagement with said symbols whereby impressions are made on said paper, said impressions identifying the carrier and the defect.

17. Apparatus for forming, on paper, a substantially permanent record of a defect detected in one of a succession of electrical devices each moved by a carrier through an inspection area to a recording station, said apparatus comprising: a movable member having mounted thereon a plurality of symbols, each identifiable with one of said carriers; means for advancing said movable member to bring to an impression-forming position the symbol identified with a device at the said station; a movable stamp, bearing a defect-identifying symbol thereon, disposed adjacent to said movable member; means responsive to the detection of a defect for advancing said stamp to bring the defect-identifying symbol thereon to an impression-forming position; and means, responsive to the detection of said defect in the device at said station for advancing said paper into engagement with said symbols whereby impressions are made on said paper, said impressions identifying the carrier and the defect.

References Cited in the file of this patent

UNITED STATES PATENTS

| | | |
|---|---|---|
| 1,626,359 | Rundell | Apr. 26, 1927 |
| 2,217,342 | Ladrach | Oct. 8, 1940 |
| 2,312,357 | Odquist et al. | Mar. 2, 1943 |
| 2,315,287 | Holloway | Mar. 30, 1943 |
| 2,402,662 | Ohl | June 25, 1946 |
| 2,587,664 | Stout | Mar. 4, 1952 |
| 2,679,317 | Roop | May 25, 1954 |
| 2,757,062 | Hood | July 31, 1956 |
| 2,767,675 | McGowan | Oct. 23, 1956 |
| 2,769,958 | Meadows et al. | Nov. 6, 1956 |
| 2,848,107 | Juengst et al. | Aug. 19, 1958 |

FOREIGN PATENTS

| | | |
|---|---|---|
| 725,199 | Great Britain | Mar. 2, 1955 |